United States Patent [19]

Hino

[11] Patent Number: 5,530,863
[45] Date of Patent: Jun. 25, 1996

[54] PROGRAMMING LANGUAGE PROCESSING SYSTEM WITH PROGRAM TRANSLATION PERFORMED BY TERM REWRITING WITH PATTERN MATCHING

[75] Inventor: Katsushige Hino, Mishima, Japan

[73] Assignee: Fujitsu Limited, Kawasaki, Japan

[21] Appl. No.: 524,797

[22] Filed: May 18, 1990

[30] Foreign Application Priority Data

| May 19, 1989 | [JP] | Japan | 1-126359 |
| May 19, 1989 | [JP] | Japan | 1-126361 |
| May 19, 1989 | [JP] | Japan | 1-126362 |

[51] Int. Cl.$^6$ ............................................. G06F 9/44
[52] U.S. Cl. ............................ 395/700; 364/DIG. 1
[58] Field of Search .......................... 364/419, 300, 364/200; 395/700; 381/43

[56] References Cited

U.S. PATENT DOCUMENTS

| 3,541,259 | 11/1970 | Gilmour | 381/43 |
| 4,395,757 | 7/1983 | Bienvenu et al. | 364/200 |
| 4,463,423 | 7/1984 | Potash et al. | 395/700 |
| 4,667,290 | 5/1987 | Goss et al. | 364/300 |
| 4,736,296 | 4/1988 | Katayama et al. | 364/419 |
| 4,864,501 | 9/1989 | Kucera et al. | 364/419 |
| 4,864,502 | 9/1989 | Kucera et al. | 364/419 |
| 4,887,212 | 12/1989 | Zamora et al. | 364/419 |
| 4,905,138 | 2/1990 | Bourne | 395/650 |
| 4,914,590 | 4/1990 | Loatman et al. | 364/419 |
| 4,931,935 | 6/1990 | Ohira et al. | 364/419 |
| 4,974,191 | 11/1990 | Amirghodsi et al. | 364/900 |
| 5,083,268 | 1/1992 | Hemphill et al. | 395/12 |
| 5,111,398 | 5/1992 | Nunberg et al. | 364/419 |
| 5,146,405 | 9/1992 | Church | 364/419 |

*Primary Examiner*—Kevin A. Kriess
*Attorney, Agent, or Firm*—Staas & Halsey

[57] ABSTRACT

A programming language processing system for a computer language processing system wherein a program described in a high level programming language is translated into another program written in lower level programming language. In one embodiment of the invention, a specification of a programming language incorporates a concept of handling various basic words classified by parts-of-speech including nouns, adjectives, conjunctions, and various logic words. The program described by the programming language is converted into an internal expression form based on a sentence structure which can be converted to a binary tree. In accordance with a logic synthesis rule for term-rewriting based on a pattern collation, a logic expressed by the internal expression form is subject to conversion to a lower level program description wherein the parts-of-speech are deleted.

5 Claims, 11 Drawing Sheets

LANGUAGE L SYSTEM

CONVENTIONAL LANGUAGE SYSTEM

PROGRAMMING LANGUAGE PROCESSING SYSTEM WITH PROGRAM TRANSLATION PERFORMED BY TERM REWRITING WITH PATTERN MATCHING

BACKGROUND OF THE INVENTION

1. Field of the Invention

The present invention relates to a programming language processing system having a part-of-speech classification realized in a computer language processing system wherein a program written using a high level programming language is translated into a lower level programming language, and more particularly to a programming language processing system having a synchronization conjunction processing system and a logic quantifier processing system in a programming language.

Conventional computer-directed languages have been used for a programming process which occupies a main part of the procedure for the present software development. Accordingly, the working time required for the programming process has been increased considerably along with the complexity of handling, thus increasing the development time. In order to improve software productivity, apart from use of a computer-directed language, it is desired to realize a description language for specification capable of natural expression and being finally executable by computers.

2. Description of the Related Art

Due to the recent progress in the information-oriented society, a large amount of software must be developed and the quality thereof must be high. For this reason, better techniques and tools in the software industrial field are pressingly needed for a rapid and accurate software development.

However, the conventional programming languages for software development still have "Computer-directed language", although some of the languages have been somewhat renewed compared with conventional machine language. Therefore, nowadays, even after a software specification has been completed in detail as required for research and development, in writing the program programmers are still forced to use a computer-directed and extremely detailed language which is relatively complicated in view of the ability of ordinary human beings. This indicates the problem arising in the present "programming process".

As far as utilizing the conventional development languages, technical improvement will be expected to a certain extent. However, it is difficult to realize a high yield in production and improvement of quality as required in the present software industrial field.

On the other hand, various descriptive methods for specification have been proposed. However, these proposed methods have the following disadvantages:

(a) The descriptivity and readability of the various proposed methods are low;

(b) The methods can be applied only to individually smaller type software products;

(c) Few considerations are made for the description of dynamic systems; and (d) Some of the methods may not always be executable by computer processing.

The above indicates that the proposed descriptive methods may not be suitable for extended practical use, for example, such as an operating system, control use software, and various application software.

In particular, in conventional type languages, the data to be handled by the program are limited to, for example, a character constant, a fixed point type constant, a floating point type constant, a character variable, and various kinds of numerical variables. In addition, modifiers for this data have been limited to, for example, a pointer modifier.

In order to improve software productivity, a macro instruction method or the like is used so as to provide a synthesis and transformation technique for the programming language. However, this method has a drawback in that a transformation can be made only with respect to a concept, not for a whole combined system, but for individual components or units independent from the others. Another drawback is that a great number of parameters are required for selecting a large number of functions. The problem that arises even in the use of the macro instruction methods is that the readability of the software is much lower than that of natural language. In fact, only professional engineers can understand the contents thereof.

A data base retrieval system by the natural language or the like has been proposed. However, this system comprises analyzing natural language, sampling particular words as a booking word, and only converting the words to a retrieval command. Therefore, the language in this data base retrieval system may not be suitable as a programming language capable of describing a procedure and defining data.

If descriptions with the concept approximating natural language, for example, "The bottle of a certain brand is put into a storehouse", "A main climbs up a high mountain", or "It is in the box", could be used to describe programs without change, then the readability and descriptivity of the program could be improved, and accordingly the production of high quality software could be increased.

SUMMARY OF THE INVENTION

An object of the present invention is to provide a programming language processing system for producing an executable computer program by means of a specification description based on a language approximating a natural language, and for improving productivity and reliability of software.

Another object of the present invention is to provide a programming language processing system for producing a programming language by which a synchronization processing in a parallel processing system can be precisely described, and for improving production and quality in development with respect to the parallel processing system.

Still another object of the present invention is to provide a programming language processing system for producing a programming language by which a set operation frequently appearing in the logic description of software can be precisely described, and for improving readability and descriptivity of the program.

The present invention is so constituted as to provide processing means wherein a specification of a programming language is adapted to utilize a basic word having a classification of parts-of-speech together with a concept of individual logic words such as, at least, a noun, an adjective, and a conjunction. Converting means is provided for converting the program described by the specification of the programming language into an internal expression form on the basis of a sentence structure which can substantially be converted into a binary tree, and for converting a logic word represented in the form of the internal expression into a lower level program description wherein the above described classification of parts-of-speech is deleted. The converting means is used with reference to a logic synthesis rule wherein term rewriting is performed on the basis of pattern collation.

Further, the present invention is so constituted as to provide processing means wherein a synchronization conjunction used as a basic word is introduced for describing "a well-formed formula (wff)" which can be written by a propositional logic or a predicate logic. The processing means is provided also for producing a row of statements of three types comprising a first statement for checking establishment of a synchronization condition, a second statement for executing a specified process when the synchronization condition has been completed, and a third statement for holding a waiting state if the synchronization condition is not yet completed until the completion thereof. The processing means produces the statements, when the synchronization conjunction is detected at the time of the translation of the programming language, in accordance with a predetermined logic synthesis rule.

Still further, the present invention is so constituted as to provide processing means wherein a logic quantifier accompanied with a set operation is introduced as a basic word of a programming language. The logic quantifier is constructed so as to be a basic word which can be used for a propositional logic formula and an act logic formula in the programs. The processing means is provided for converting a sentence including the logic quantifier, into a statement reduced to a basic operation. The processing means converts the sentence, in accordance with a logic synthesis rule, when the logic quantifier accompanied with the set operation are detected at the time of the translation of the programming language. The logic synthesis rule provides a method of rewriting the statement as a plurality of basic operations using the lower level language which can include a repeating process.

DESCRIPTION OF THE PREFERRED EMBODIMENTS

Figure 1:
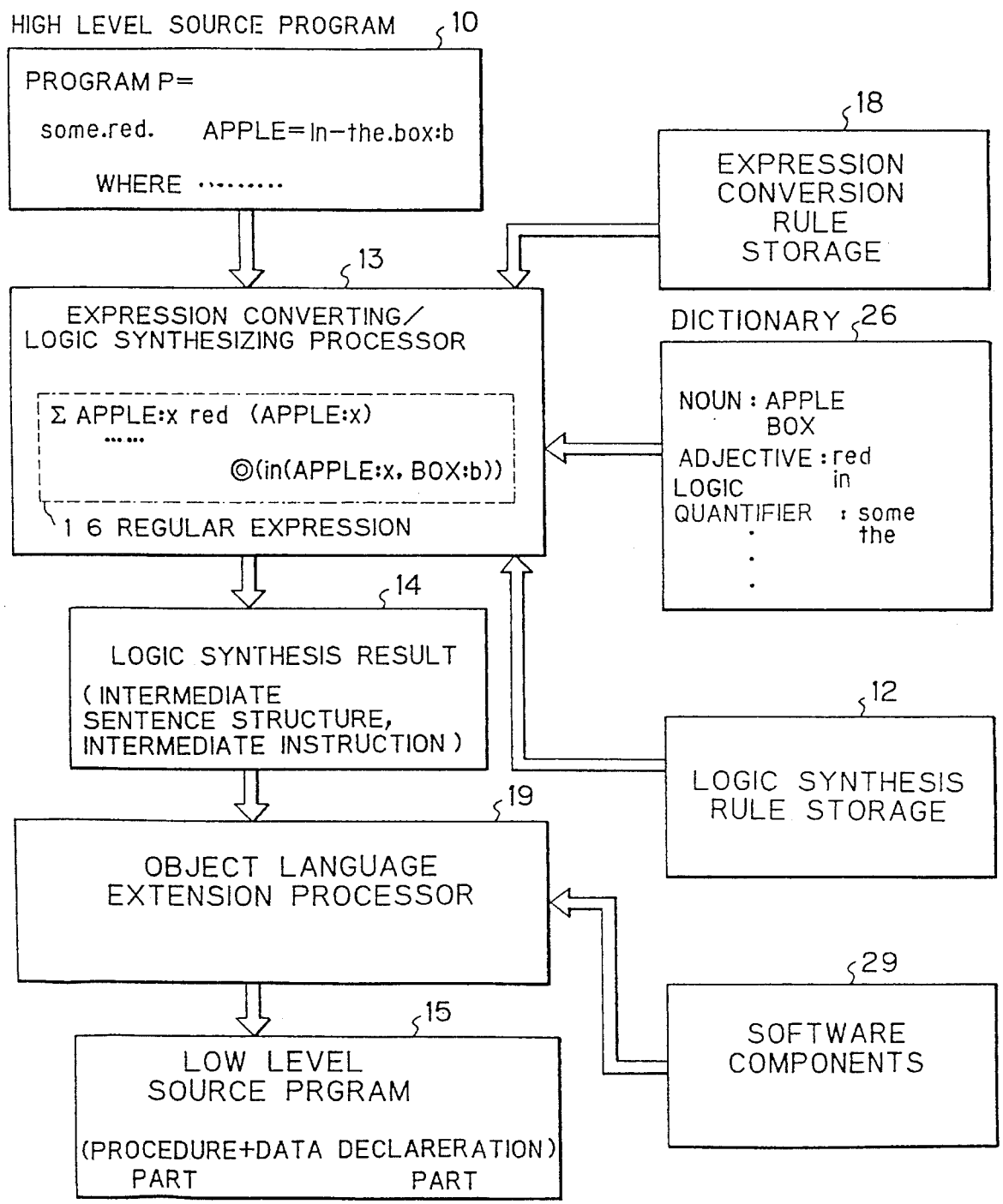
FIG. 1 is a block diagram illustrating an embodiment of the present invention.

FIG. 1 is a block diagram illustrating an embodiment of the present invention, wherein the configuration includes a high level source 10 to be a translation object, a logic synthesis rule storage 12 for storing logic synthesis rules including various term rewriting rules, an expression converter/logic synthesis processor 13, a result of the logic synthesis 14, a low level source program 15 extended to a form more approximating to that of the machine language in comparison with a high level source program 10, a regular expression 16 based on a sentence constitution which can be converted into a binary tree, an expression conversion rule storage 18 for storing conversion rules to the regular expression 16, an object language extension processor 19 for extending to a code written by an object language with respect to a result of the logic synthesis 14, a dictionary 26 for storing classification of parts-of-speech in vocabulary and meta-information and the like, software 29 which corresponds to prototype for such as a function, a subroutine, and a declarative sentence.

A descriptive language of a high level source program 10 according to the present invention is provided with vocabulary corresponding to the natural language and classification of parts-of-speech in the unified form having mutual organic relation. For example, features of the descriptive language will be shown as follows;

(a) The language incorporates a concept of a common noun (sort), and other parts-of-speech, such as an adjective, a conjunction, a logic quantifier, a logic operative and the like.

(b) The language contains a synchronization (synchronous) conjunction WHEN. This results in a extremely concise description of a synchronous/transmission processing between processes which is indispensable at the time of producing a dynamic or parallel system.

(c) A logic quantifier used for a set operation, "all," "some," and "many" are being prepared. These quantifiers are utilized in both a propositional formula (a discriminant formula of reality) and an act formula (a conversion formula of world state). As a result, the set operation can be described rapidly and precisely using the quantifiers, while in the conventional type language it has been avoidable to describe the set operation in the form of repeating process.

(d) There is another logic quantifier "the".

(e) Existential words "be" and "nil" are prepared for representing a concept of: "- - - produce - - - ( - - - exist)"; "- - - vanish - - - ( - - - do not exist)".

(f) A modifying expression approximating that of the natural language is possible.

(g) An act formula (expression of reality that states "- - - is - - - ") can be formed on the basis of a propositional formula (expression of act that states "- - - do - - - ").

Based on thus written specification description, in order to produce a program written in the object language executable on the computer, the following process constitution is provided in the present invention.

The expression converter/logic synthesis processor 13, with reference to the expression conversion rule storage 18 and the dictionary 26, converts the high level source program 10 into the regular expression 16, i.e., the internal expression form made from the sentence structure which can be transformed from the source program to the binary tree. The regular expression 16 employs an expression which is made from the sentence structure on the basis of a high order intentional logic.

Moreover, the expression converter/logic synthesis processor 13 rewrites a matching pattern for the regular expression 16 in accordance with the logic synthesis rule due to a pattern collation which is registered in advance in the logic synthesis rule storage 12. Thus, the expression converter/logic synthesis processor 13 sends out the output as the logic synthesis result 14. The result 14 comprises an intermediate sentence and an intermediate instruction group in the form wherein the part-of-speech is externally deleted.

The object language extension processor 19, using the predetermined extension rule or software component 29, produces a procedure part of a program based on the object language, for example, language C from the intermediate sentence and intermediate instruction. At the same time, the extension processor 19 automatically generates a data declaration part which is required by the program. The result is sent out as an output of the lower level source program 15.

An executable type module can be produced in such a way that the lower level source program 15 is converted to the machine language object by the conventional compiler and the like as required, and thus converted language is then used to process compiling and coupling by a linker and so forth.

Operation

In the high level source program 10 according to the present invention, the specification is written by using vocabulary and the part-of-speech group corresponding to the natural language, and therefore the program can easily be produced by describing in such a manner that the given problem is traced as is.

The regular expression 16 is represented by the sentence based on the high order intentional logic which is widely known in the linguistics and logics field. By converting this regular expression form into the internal expression form corresponding to the high level source program 10, such regular expression form is relatively easily reduced into a language having a theoretically executable sentence structure rule.

The term rewriting technique in accordance with the logic synthesis rule is widely known. However, in the conventional technique, the term rewriting process has only been used such that "the rewriting itself is an execution of program", for example, like a logic type language in an inference system.

According to the present invention, the term rewriting is processed also as a logic synthesis of the program which should be performed before the execution of the object program. In comparison with the conversion performed by the conventional macro instruction method and the like, the collation and conversion for any desired pattern can be made in the present invention, and therefore the capability for the synthesis and conversion of the program is considerably increased.

In the intermediate instruction of the logic synthesis result 14, a grammatical rule is that a name (adjective) of a relation intended to be checked or set up by the instruction and a kind (common noun) including an element relative to the aforegoing relation, by all means, are specified as a parameter.

For instance, the intermediate instruction which determines the relation of "place a pen x on a desk y", will be described as follows:

do (2, on, pen, desk, x, y)

where "on" corresponds to "a name (adjective) of a relation" above described, and "pen" and "desk" corresponds to "a kind (common noun) which elements (x, y) relative to the relation belong to". In the above case, "2" shows the number of the parameter of "on", and "2" may be eliminated.

In view of the aforegoing, if the program described by the intermediate language is analyzed, it will be found what kind of the thing and name of the relation the program has been conscious of, whereby the data declaration part required for the program operation can be automatically generated.

The program language relative to the embodiment according to the present invention is hereinafter referred to as "language L". The processing constitution will now be described as follows.

[1] System Constitution and Use of Language L

Figure 2:
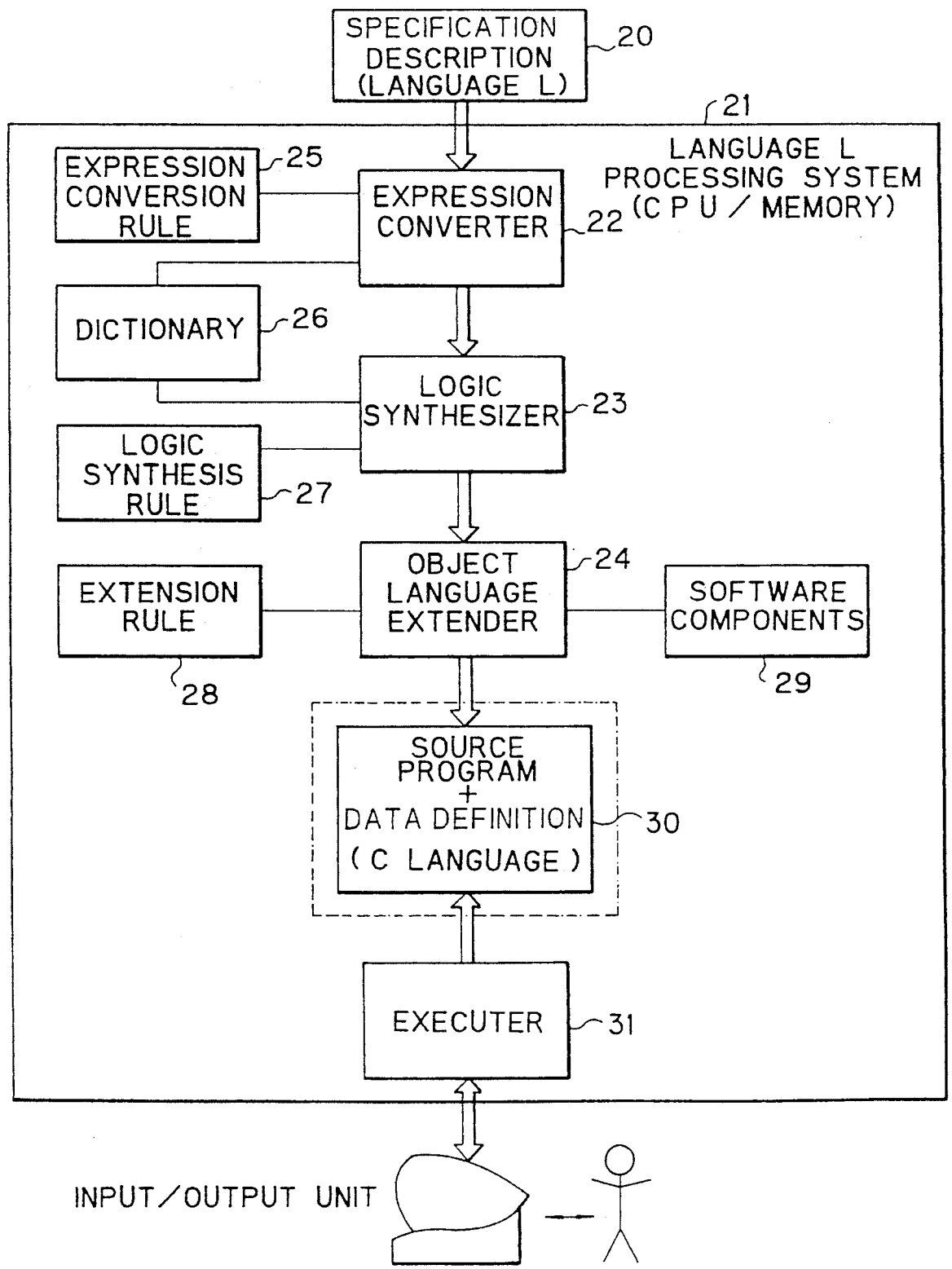
FIG. 2 is a block diagram illustrating an example for a system constitution of the present invention.

FIG. 2 is a block diagram illustrating an example for a system constitution and its use in the present invention.

A processing system 21 for language L is a combined system as a whole comprising from a specification description through a program synthesis and extension up to an execution of the object program derived from the processing result.

The processing system 21 for language L may now be divided into relatively larger components such as a expression converter system 22, a logic synthesizer system 23, an object language extender system 24 and an executor system 31. If a program described by the language L is given into these systems, finally a source program and a data definition part 30 are written by the object language (for example by the well known conventional language C) to generate automatically. More executable modules are produced by a repeating compiler.

An individual function of components will be described as follows:

① Expression converter system 22: The program represented by language L, mainly in accordance with the expression conversion rule 25, is converted into the internal expression (the binary tree the term of which is basic words of language L) and vice versa.

② Logic synthesis system 23: A given program of language L expression is synthesized with reference to a semantic definition of the conjunction, logic operative, logic attributive, noun, and adjective. Thus, there is effected program output consisting merely of a small number of intermediate instructions and sentence structure elements (that is, an intermediate language).

③ Object language extension system 24: The intermediate language expression program completed by the logic systhesis is extended to a particularly specified object language expression program. At the same time, a data definition is automatically made sampling out as required for operating that program.

④ Executor system 31: The object language expression program of the output derived through the respective components as described above is compiled and executed at this system 31. More specifically, since the command sentence and the semantic definition which are given to the system are included in the specification description of the system in language L, an additional command definition is unnecessary when an execution is required. Thus, the execution can immediately be performed.

The individual rules which are applied to these components are basically utilized as a term rewriting rule under a term rewriting system accommodated in language L processing system 21.

[2] Specific Description Method by Language L

The specification description by language L basically uses the noun, logic word, and conjunction. As is apparent from the above, to write in language L is substantially the same as writing in the natural language. Therefore, in the same way that no particular description method may be found when the description is written by the natural language, also no particular description method may be found when the description is written by language L. The basic word in the present language L is of property enough to represent the accurate specification description.

Features of language L will be now described as follows:

(1) Since language L is so constituted as to sample out only the portion relative to logical meaning from the natural language, language L is relatively more accurate and easier as a specification description language comparing with the natural language.

(2) An additional advantage tacitly obtained using language L is that software development can be realized by vocabulary sharing system. More specifically, it becomes possible to realize a procedure for software development. That is, as far as the same language is applied for respective processes, it is proved that: difference or collision does not arise at the time of mutual interface between programs; software is developed through use of the same language; and an entire execution using language L can be processed exactly as a whole system.

(3) The language L has no verb. This indicates that the language L is one extremely based on logics. In the language L, the dynamic specification ( - - - do some act - - - ) is represented as a string of a kind of state ( - - - is a certain state of - - - ) (however, this is quite different from a state transition expression in view point of expressing "system (logical connection)"). A simple example of the dynamic specification will be described as follows. If a certain thing "x" is transferred from the point "p" to the point "q", in language L the expression is that "the. thing: x=at-the. point: p ⇨ the. thing: x=at-the. point: q" (that is, "thing x is now at point p and thereafter at point q").

(4) The entire software system description in language L is performed in the form of the definition correspondingly between a stimulus to the software system from an external field and its meaning. (As a typical case, this stimulus is a command which can be given to the software system.) Moreover, the meaning of the stimulus is a reaction which the system generates in response to the given stimulus.

If a stimulus (command) enters the system, an execution form surely be generated in such a manner that a process is generated within that system and expresses (execute) a reaction responsive to the stimulus (command).

The example for the specification description by language L is as follows. The sentence structure rule of language L is not yet described exactly at this point of the specification of the present invention, and therefore only an outline of the language L may be understood. The following example for the system will be understood by a reader from meaning roughly described as follows. "A=B" is read as "A is B". "noun A. noun B" is "B of A". "adjective A. noun B" is "B which is A" or "A B". "all. noun A" is "all A". Moreover, "noun A: x" is read as "the A, if it is x, it - - - ".

[EXAMPLE 1: Wine Dealer Storehouse Control System]

Problem

A storehouse control system for a wine dealer must be responsive to the following circumstances or conditions;

A container in which any number of wine bottles of various brands are accommodated is sent to a storehouse sometimes.

Responding to customers, the specified number of wine bottles of specified brands are delivered to the customers. If the above specified bottles are not in the storehouse partly or in the whole, firstly, the stored number of bottles are delivered to the customers and secondly, the rest are delivered rapidly when sent to the storehouse.

When a container becomes empty, it is sent out from the storehouse immediately.

---

Description by Language L

---

' storehouse generation : s ' ≡
    the. storehouse : s = be
' container generation : c ' ≡
    the. container : c = be
' wine bottle accommodation : c : m : n' ≡
    many : n. bottle : b = be
    WHERE
        the. bottle : b = of - the. brand : m and
        the. bottle : b = in - the. container : c
' container sent in : c : s ' ≡
    the. container: c = in-the. storehouse: s
' customer order : k : m :n ' ≡
    REPEAT n
WHEN some. (of-the. brand: m). bottle: b
    = in some. storehouse: s
    the. bottle: b= in-the. customer: k and
    the. bottle: b= not-in-the. storehouse: s
' empty container automatically sent out ' ≡
    WHILE ever
        WHEN for some.(in-some.storehouse:s).container:c
            all. bottle=not-in-the.container:c
        the. container: c= not-in-the. storehouse: s

---

The example described in the above is a complete specification description written in language L for a storehouse control system of a wine dealer. If the above specification is given to language L processing system, executable codes are generated automatically, and if a command is taken in, the operation is started.

The program reads as follows.

The whole program constitution of storehouse control is described as follows.

'storehouse generation: s' ≡P 1
    'container generation: c' ≡P 2
    'wine bottle accommodation: c: m: n' ≡P 3
    'container sent in: c: s' ≡P 4
    'customer order: k: m: n' ≡P 5
    'empty container automatically sent out' ≡P 6

The above can be read as "the wine dealer storehouse control system is made by processing the commands in the number of 6 (which is given in quotation marks), and the meanings of these commands are represented by P1, P2, - - - , P6." The characters in a row which is given in quotation marks is a command character row itself to be effected as an entry by an operator, and ": variable" is a parameter of that command.

In the descriptive portion of the individual command, for example, the storehouse generation can be read as "storehouse generation command means that one storehouse having a name indicated by "s" is generated (be)." This command is only for setting up a circumstance of the given problem.

A command for the wine bottle accommodation is read as "Wine bottle accommodation command means that wine bottles in the specified number ("many: n") having a specified brand ("of-the. brand: m") is accommodated in the container ("in-the. container: c").

Customer order is read as "customer order means that: the wine bottle having a specified brand is in storehouse in somewhere ("WHEN some. (of-the. brand: m).bottle: b=in-some. storehouse: s"); the wine bottle is delivered to the customer ("the. bottle:b=in-the.customer:k"); and the bottle is not in the storehouse ("the.bottle:b=not-in-the.storehouse:s"), and customer order also means that the above execution is repeated as many times as that of the required bottle number ("REPEAT n")." It should be noted that conjunction WHEN used in this command has a meaning wherein if a condition described in the command is not satisfied, processing is kept in synchronization (standby) until the condition is satisfied.

The conjunction WHEN and adjective "in" in this example of the program exhibits in particular an important function. Function of WHEN is described in the foregoing, and function of "in" is to act as a relation having a kind of transitivity (a relation having a kind of transitivity is defined in the dictionary of language L).

For example, from a transitivity of the adjective "in", language L makes reasoning that if a bottle is put in a container, and the container is sent to a storehouse, then the bottle also is put in the storehouse, and that if a bottle is sent out from a storehouse to a customer somewhere, the bottle is not in any container in the storehouse. The above meaning is given as a logical result.

The complicated system control of the wine dealer storehouse is easily expressed only by the use of the simple description as described above and by the organic utilization of language meaning.

Furthermore, the difference from the conventional method for software development will be described as follows. In the conventional processing for development, it is an ordinary method to share the command processing of six portions with six persons respectively. In this case, since the six portions have a close relation with each other, it is necessary to determine a mutual interface condition in advance and then to exercise a combined test in the whole system after completion thereof. The software development method as described above is applied in the same manner also for the case that the whole system is developed by only one person.

To the contrary, according to the present invention, conformation process for mutual interface and whole consistency is not required. This is in most part attributed to the vocabulary sharing and the function of the conjunction WHEN, logical quantifier such as "all", "some", etc.

Figure 3A:
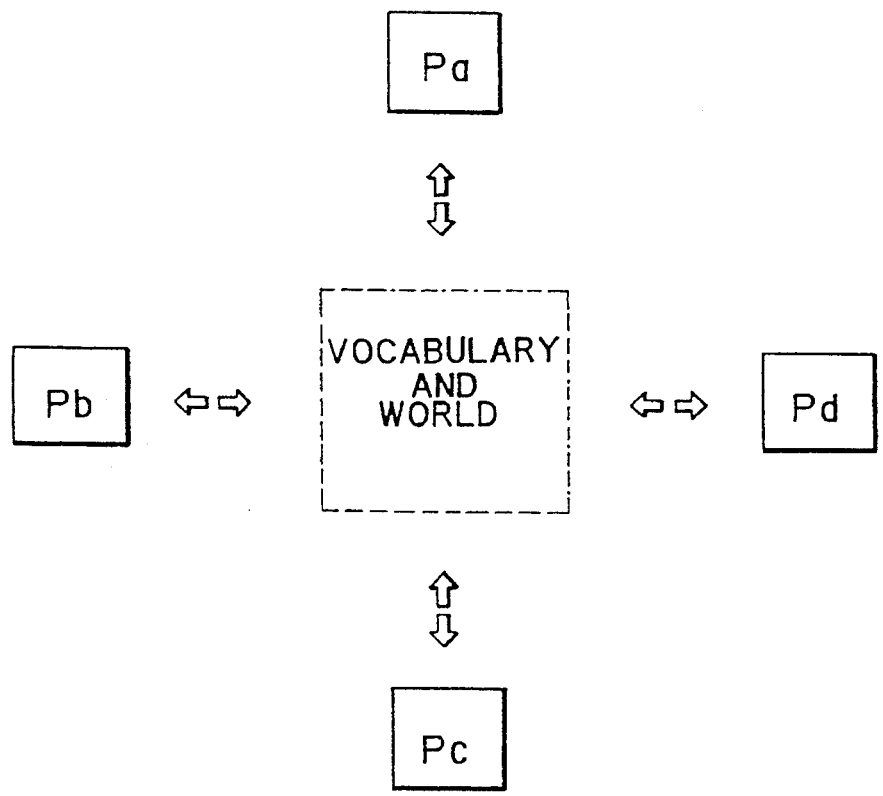
FIGS. 3A and 3B are diagrams illustrating a relationship between a program and a process with respect to an embodiment of the present invention (FIG. 3A) and a conventional system (FIG. 3B).
Figure 3B:
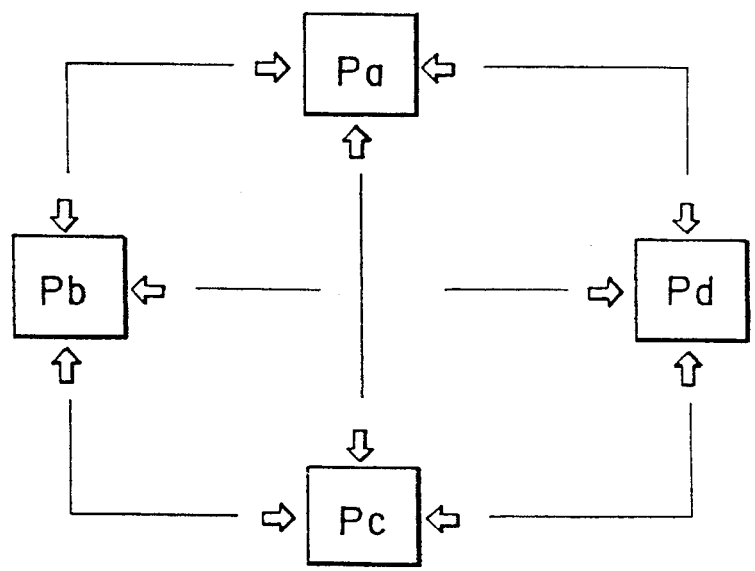

FIGS. 3A and 3B are diagrams illustrating a relation between program and process. A mutual interface problem of programs arising at the time of the software development and a mutual interaction in execution process of software system both are illustrated in FIGS. 3A and 3B in a way of combination. Symbols Px such as Pa, Pb, - - - show programs (process) respectively, and arrow marks illustrate these mutual interfaces.

[EXAMPLE 2: Declarative Description of Mathematical Function by Language L]

Problem

Writing out a program by which a solution of "Fibonacci function" or "MacCarthy 91 function can be obtained.

| Description by language L |
|---|
| 'Fibonacci:a' ≡ <br>     FOR the.numeral:a,some.function:f <br>         f<a>=answer <br>     WHERE <br>         f<0>=1 and <br>         f<1>=1 and <br>         for all.numeral:x <br>             f<x+2>=f<x+1>+f<x> <br> '91 function a' ≡ <br>     FOR the.numeral:a,some.function:f <br>         f<a>=answer <br>     WHERE <br>         for all. numeral:x <br>            ((x>100→ f<x>=x−1)and <br>            (x ≦ 100 → f<x>=f<f<x+11>>)) |

Most of the above described expressions are so basic as to be found in a mathematical text book, and in other words, any consideration for algorithm is unnecessary. Needless to say, not only such as mathematical function but also any of a restraint description in language L can be expressed by the above type program.

Moreover, in comparison with the conventional language, the advantages will be shown in particular with respect to an adjective, logical quantifier, synchronization conjunction WHEN, and real existential word "nil".

The comparison example clearly indicates a complexity and the decreased yield of production in the use of the conventional computer-directed language, as shown in the following. From these examples, it is rational and not luxurious one to demand a realization of such an executable description language.

[EXAMPLE 3: Function of Language L Adjective (Relation Description)]

Assuming a program for processing that "- - - put a certain apple on a certain desk". The following shows a difference between the descriptions by the conventional language and by language L. The difference shows that the case in language L is apparently much more concise than the conventional one. In language L, a data definition is unnecessary.

| Description by Conventional Language | Description by Language L |
|---|---|
| program= <br>   R1→apple.ON:=R2 <br>   R2→desk.ON:=R1 <br> data definition= <br>   data apple <br>     field ON <br>   data desk <br>     field ON | program= <br>   the.apple:a=on-the.desk:d |

[EXAMPLE 4: Function of Logical Quantifier in Language L]

Assuming a program for processing that "- - - put a certain apple on the blue desk". Following shows a difference data between the conventional language and language L. The difference shows that the case of language L is apparently more concise with respect to the conventional one.

| Description by Conventional Language | Description by Language L |
|---|---|
| program= | program= |
|   R1:=TOPTABLE.apple |   some.apple= |
|   if R1 ≠ 0 then |     on-some.blue.desk |
|     begin | |
|       R2:= TOPTABLE.desk | |
|       until R2=0 | |
|     begin | |
|       if R2→desk=blue then | |
|       exist | |
|       R2:= R2→desk.NEXT | |
|     end | |
|   if R2 ≠ 0 then | |
|     begin | |
|       R1 →apple.ON:=R2 | |
|       R2 →desk.ON:=R1 | |
|     end | |
|   end | |
| data definition= | |
|   data TOPTABLE | |
|     field apple | |
|     field desk | |
|   data apple | |
|     field ON | |
|     field NEXT | |
|   data desk | |
|     field ON | |
|     field NEXT | |

[EXAMPLE 5: Function of Synchronization Conjunction WHEN in Language L]

When language L is used, how the synchronization conjunction WHEN in language L simplifies the description of a dynamic or parallel system compared with the conventional language, will be understood in a simple example as follows.

Assuming a dynamic system comprising 6 programs, that is: a program A where if "p" and "q", or "s" are reached, then "u" is executed; a program B where if "q" and "r" are reached, then "v" is executed; a program P where "p" is executed; a program Q where "q" is executed; a program R where "r" is executed; and a program S where "s" is executed.

Now the comparison of the case in the conventional language with language L will be shown as follows.

The description by the conventional language below is extremely difficult to understand (reader may not easily imagine to reversely obtain the originally given specification from this program group), and in addition, the conventional description tends to be mistook. Contrary to this, the language L description is so written as to trace substantially along with the given problem (how the description in language L is executable and operable, will follow in detail in a later chapter in this specification).

| Description by the Conventional Language | |
|---|---|
| program A= | program B= |
|   wait(A) |   wait(B) |
|   u |   v |
| program P= | Program Q= |
|   p |   q |
|   if q or s |   if r |
|     then |     then |
|       post(A) |       Post(B) |
| |   if p or s |
| |     then |
| program R= | Program S= |
|   r |   s |
|   if q |   post(A) |
|     then | |
|       post(B) | |

| Description by the Language L | |
|---|---|
| Program A= | Program B= |
|   WHEN(p and q) or s |   WHEN q and r |
|   u |   v |
| Program P= | Program Q= |
|   p |   q |
| Program R= | Program S= |
|   r |   s |

[EXAMPLE 6: Function of Real Existential Word "nil"]

Assuming a processing when a job scheduler in an operating system terminates a certain job. In such a case, the job scheduler not only has to terminate the job but also in advance make a processing to send back all resources such as memory, external storage, and the like which have been assigned to this job. The external storage is assumed to have as usual a hierarchy structure such as member/file/volume. Such a job scheduler written in both the conventional language and language L is shown as follows.

Description by Conventional Language (For clear understanding of an existential "nil", a basic word and a sentence structure are used in this example, but not in the conventional language. If this "nil" arrangement is not made, this kind of program becomes more complicated.)

```
Job scheduler =
    for all.(of-the.job).member
        begin
            the.member=not-of-the.job
        end
    for all.(of-the.job).file
        begin
            the.file=not-of-the.job
        end
    for all.(of-the.job).volume
        begin
            the.volume=not-of-the.job
        end
    for all.(of-the.job).memory
        begin
            the.memory=not-of-the.job
        end
    the.job=nil
```
Description by Language L
```
job scheduler=
    the.job:j=nil
```

More specifically, language L uses the real existential word (non-real-existential word) "nil", which is defined in language L as a word having an agreement that if a certain thing becomes "nil" (becomes non-real-existential state), the thing comes to have no relation with any other entity (existence). As will be seen in the above job scheduler, such a concise description can be enough to execute the processing.

In order to supplement the foregoing, in the problem of this job scheduler, if there is given in addition a condition that if a file is assigned to a job, but still intended for the use of the job and at this time another job comes to wait, then immediately the file is assigned to that other job (such a case often appears in ordinary processing). Thus, integrated functions of both the above additional condition and the synchronization conjunction WHEN remarkably increase a superiority of the description by language L compared with the conventional way.

[3] Logic System Organization of the Language L

Language L is based on "a natural language". In more detail, language L is constituted on the basis of a high order intentional logic to depend on a logic organization (hereinafter referred to as a logic) as extended by introducing dynamic logic and concept of sort.

[3.1] Syntax (1) Type: A set of type of language L is a minimum set T to satisfy the following condition, ① $e, t \in T$ ①' $c, p, u_t, \sim, u_n \in T$ ② if $a \in T$ and $b \in T$, then $<ab> \in T$ ③ if $a \in T$, then $<sa> \in T$ A semi-ordered relation $\leq$ is defined on the set of type of language L, and satisfying the below conditions.

(a) $u_t, \sim, u_n \leq e$ (b) if $v \leq a$ and $w \leq b$, then $<vw> \leq <ab>$ (2) Primitive Symbol: $\equiv$(equality), $\lambda$(abstraction), $\uparrow$(intention), $\downarrow$(extension), [(left parenthesis), ](right parenthesis), and, for each type "a", enumerable constants "$C_a^1$, $C_a^2$," and enumerable variables "$x_a^1$, $x_a^2$" are prepared. Further, a constant of type $<e^n t>$ (this expresses 'relation' intuitively) is classified into either of a base relation or derivative relation.

The constant $<e^n t>$ is an abbreviation of $<e<e \ldots <et>>$.

(3) Consistent wff: A set "Wa" of consistent wff of type "a" in language L is defined recursively in following.

① $X_a \in W_a$ for all variables $X_a$ of type "a" in language L.

② $C_a \in W_a$ for all variables C of type "a"

③ if $A \in W_{<ab>}$ and $B \in W_a$, then $<A\ B> \in W_b$.

④ if $A \in W_b$ and $x \in W_a$, then $\lambda x, A \in W_{<ab>}$.

⑤ if $A, B \in W_a$, then $[A \equiv B] \in W_t$.

⑥ if $A \in W_a$, then $\uparrow A \in W_{<sa>}$.

⑦ if $A \in W_{<sa>}$, $\downarrow A \in W_a$.

⑧ if $A \in W_t$, $\odot A \in W_p$.

⑨ if $A \in W_p$, and $B \in W_p$, then $[A \Rightarrow B] \in W_p$.

⑩ if $x \in W_e$ (x is variable), then $\Rightarrow x \in W_{<sp>}$.

⑪ if $A \in W_t$, $[\sim A] \in W_t$.

⑫ if $A \in W_t$ and $B \in W_p$, then $[A \Rightarrow B] \in W_t$.

⑫' if $a \in W_p$ and $B \in W_p$, then $[A$ and $B] \in W_p$.

⑬ if $A \in W_t$ and $B \in W_p$, then $[A \vee B] \in W_t$.

⑬' if $A \in W_p$ and $B \in W_p$, then $[A$ or $B] \in W_p$.

⑭ if $A \in W_t$ and $B \in W_p$, then $[A \rightarrow B] \in W_t$.

⑭" if $A \in W_t$ and $B \in W_p$ and $C \in W_p$, then [IF A B C] $\in W_p$.

⑮ if $x_A \in W_A$ (x is variable) and $B \in W_t$ and $C \in W_p$ then [II $x_A$ B C] $\in W_p$ ⑮' if $x_A \in W_A$ (x is variable) and $B \in W_t$ and $C \in W_p$ then [II $x_A$ B C] $\in W_p$ ⑯ if $x_A \in W_A$ (x is variable) and $B \in W_t$ and $C \in W_p$ then [$\Sigma x_A$ B C] $\in W_p$ ⑯' if $x_A \in W_A$ (x is variable) and $B \in W_t$ and $C \in W_p$ then [$\Sigma x_A$ B C] $\in W_p$ ⑰ if $D \in W_c$ and $x_A \in W_A$ (x is variable) and $B \in W_t$ and $C \in W_p$, then [$\Theta D\ x_A$ B C] $\in W_t$ ⑰' if $D \in W_c$ and $x_A \in W_A$ (x is variable) and $B \in W_t$ and $C \in W_p$, then [$\Theta D\ x_A$ B C] $\in W_t$ ⑱ if $C \in W_c$ and $A \in W_p$, then [REPEAT C A] $\in W_p$ ⑲ if $A \in W_t$ and $B \in W_p$, then [WHEN A B] $\in W_p$ ⑳ if $A \in W_t$ and $B \in W_p$, then [WHILE A B] $\in W_p$ ㉑ if $A \in W_e$, [be A] $\in W_t$ ㉒ if $A \in W_e$, [nil A] $\in W_t$ ㉓ if $A \in W<e^n t>$, [not A] $\in W_t <e^n t>$ ㉔ if $x \in W_e$ (x is variable) and $A \in W_t$ and $B \in W_c$, then [sum x A B] $\in W_c$

[3.2] Semantics (1) Model: A model "M" of logical language L is an order pair $<D, I, m>$.

Where:

D: non-empty enumerable infinitive set

I: a set of the natural number, on which an ordinary mathematical axiom is established m: function capable of assignment of "$D_{<sa>}$" to respective constant element, satisfying the following formula ① as for all base relation $C<e^n t>$, $m(C <e^n t>) (0, 1) = \phi$ ② $m(C_e)(<i,j>) = m(C_e)(<0, 1>)$ ③ $m(C <e^n t>) (<i, j>) = m(C <e^n t>) (<i, k>)$ An interpretation domain of logic L is determined as follows.

① $D_e = D$

①' $D_{ui} \subset D$ where $D_{ui}$ is enumerable infinitive set, and if $v \leq w$, then $D_v \subset D_w$.

②' $D_c = I$

③ $D_t = \{1, 0\}$

④' $D_p = \{1, 0\}$

⑤ $D_{<ab>} = \{f | f: D_a \rightarrow D_b\}$

⑥' $D_{<sa>} = \{f | f: S \rightarrow D_a\}$ where $S = \{<i, j> | i, j \in I, i < j\}$ this hereinafter referred to as the same (2) Assignment: A variable assignment function is prepared to permit an element "$D_a$" to correspond each variable "$x_a$".

(3) Valuation function: In the case a valuation function "v" can give meaning value relative to a model "M," "$<i, j> \in S$", and variable assignment function "$\alpha$" to a given consistent wff, such a valuation function "v" is defined recursively as shown below. $\lceil V (M, <i, j>,, W) \rfloor$ is abbreviated to $\lceil Vi,j, \alpha(W) \rfloor$.

① $Vi,j, \alpha[x_a] = \alpha[x_a]$

② $Vi,j, \alpha[C_a] = (m (C_a))(<i, j>)$

③ $Vi,j, \alpha[A_{ab}\ B_a] = Vi,j, \alpha[A_{ab}](Vi,j, \alpha[B_b])$

④ $Vi,j, \alpha[\lambda x_a\ A_b] =$ a function on from $D_a$ to $D_b$ wherein a value in $X \in M_a$ is equal to $Vi,j,\alpha [A_b]$.

where $\alpha' = \alpha (x/X)$.

"$\alpha' = \alpha (x/X)$" represents the same variable assignment function as "$\alpha$", except the case it assigns "X" to "x".

⑤ $Vi,j, \alpha [A_a \equiv B_a] = 1$ iff $Vi,j, \alpha [A_a] = Vi,j, \alpha [B_a]$ ⑥ $Vi,j,\alpha [\uparrow A_a] =$ function from S to $D_a$ wherein a value in $<i',j'> \in S$ is equal to $Vi'.j', \alpha [A_a]$ ⑦ $Vi,j, \alpha [\downarrow A_{<sa>}] =$ $Vi,j,\alpha [A_{<s<sa>>}] (<i, j>)$ ⑧ $Vi,j, \alpha\ m\ n\ [\odot A_t] = 1$ iff k where $j < k \in I$, and $Vj,k,\alpha [A_t] = 1$ ⑨ $Vi,j,\alpha [A_p\ z, 1\ B_p] = 1$ iff $i < j' < i' < j$ is conditioned to $j', i' \in I$, accordingly $Vi, j', \alpha [A_p] = 1$ and $Vi', j, \alpha [B_p] = 1$ ⑩ $Vi,j,\alpha [\downarrow(\Rightarrow x_A)] = 1$ iff $V_{i,j,\beta}$ [be $A_A$]=1
where
$\alpha(x_A)=$
$V_{i,j,\beta}$ [$A_A$]

⑪ $V_{i,j,\alpha}$ [~$A_t$]=1 iff
$V_{i,i,\alpha}$ [$A_t$]=0

⑫ $V_{i,j,\alpha}$ [$A_t \wedge B_t$]=1 iff
$V_{i,j,\alpha}$ [$A_t$]=1 and
$V_{i,j,\alpha}$ [$B_t$]=1

⑫' $V_{i,j,\alpha}$ [$A_p$ and $B_p$]=1 iff
$V_{i,j,\alpha}$ [$A_p$]=1 and
$V_{i,j,\alpha}$ [$B_p$]=1

⑬ $V_{i,j,\alpha}$ [$A_t \vee B_t$]=1 iff
$V_{i,j,\alpha}$ [$A_t$]=1 or
$V_{i,j,\alpha}$ [$B_t$]=1

⑬' $V_{i,j,\alpha}$ [$A_p$ or $B_p$]=1 iff
$V_{i,j,\alpha}$ [$A_p$]=1 or
$V_{i,j,\alpha}$ [$B_p$]=1

⑭ $V_{i,j,\alpha}$ [$A_t \rightarrow B_t$]=1 iff
$V_{i,j,\alpha}$ [$A_t$]=0 or
$V_{i,j,\alpha}$ [$B_t$]=1

⑭' $V_{i,j,\alpha}$ [IF $A_t$ $B_p$ $C_p$]=1 iff
if $V_{i,j,\alpha}$ [$A_t$]=1, then
$V_{i,j,\alpha}$ [$B_p$]=1
if $V_{i,j,\alpha}$ [$A_t$]=0, then
$V_{i,j,\alpha}$ [$C_p$]=1

⑮ $V_{i,j,\alpha}$ [Π $X_A$ $B_b$ $C_t$]=1 iff
for all variable assignment function $\alpha'$, and except assignment to $X_A$,
$V_{i,j,\alpha'}$ [be $X_A$]=1 and
$V_{i,j,\alpha'}$ [$B_t$]=1, then
$V_{i,j,\alpha'}$ [$C_t$]=1

⑮' $V_{i,j,\alpha}$ [Π $X_A$ $B_t$ $C_p$]=1 iff
for all variable assignment function $\alpha'$, and except assignment to $X_A$,
$V_{i,j,\alpha'}$ [be $y_A$]=1 and
$V_{i,j,\alpha'}$ [$B_t$]=1, then
$V_{i,j,\alpha'}$ [$C_p$]=1

⑯ $V_{i,j,\alpha}$ [Σ$X_A$ $B_t$ $C_t$]=1 iff
for all variable assignment function $\alpha'$, and except assignment to $X_A$,
$V_{i,j,\alpha'}$ [be $X_A$]=1 and
$V_{i,j,\alpha'}$ [$B_t$]=1, and
$V_{i,j,\alpha'}$ [$C_t$]=1

⑯' $V_{i,j,\alpha}$ [Σ$X_A$ $B_t$ $C_p$]=1 iff
for all variable assignment function $\alpha'$, and except assignment to $X_A$,
$V_{i,j,\alpha'}$ [be $X_A$]=1 and
$V_{i,j,\alpha'}$ [$B_t$]=1, and
$V_{i,j,\alpha'}$ [$C_p$]=1

⑰ $V_{i,j,\alpha}$ [Θ$D_c$ $X_A$ $B_t$ $C_t$]=1 iff
the same as in the case of "$\alpha$", except relative to different assignment value of $X_A$
Assignment functions $\alpha_1 \sim \alpha_D$ different from each other are provided.
$V_{i,j,\alpha k}$ [be $y_A$]=1 and
$V_{i,j,\alpha k}$ [$B_t$]=1 and
$V_{i,j,\alpha k}$ [$C_t$]=1
where "k" satisfies $1 \leq k \leq D$ ⑰' $V_{i,j,\alpha}$ [Θ$D_c$ $X_A$ $B_t$ $C_p$]=1 iff
the same as in the case of "$\alpha$", except relative to different assignment value of $X_A$
Assignment functions $\alpha_1 \sim \alpha_D$ different from each other are provided.
$V_{i,j,\alpha_k}$ [be $y_A$]=1 and
$V_{i,j,\alpha_k}$ [$B_t$]=1 and
$V_{i,j,\alpha_k}$ [$C_p$]=1
where "k" satisfies $1 \leq k \leq D$ ⑱ $V_{i,j,\alpha}$ [REPEAT $A_c$ $B_p$]=1 iff
"i=$i_1$ <$j_1$<..., <$i_A$<$j_A$=j" is conditioned to "$i_1$, $j_1$, ..., $i_A$,$j_A$".
$V$ $i_k$, $j_k$, $\alpha$, [$B_p$]=1
where "k" satisfies $1 \leq k \leq A$ ⑲ $V_{i,j,\alpha_k}$ [WHEN $A_t$ $B_p$]=1 iff
if $V_{i,j,\alpha}$ [$A_t$]=1 then
$V_{i,j,\alpha}$ [$B_p$]=1
if $V_{i,j,\alpha}$ [$A_t$]=0 then
$V_{i+1,j,\alpha}$ [WHEN $A_t$ $B_p$]=1

⑳ $V_{i,j,\alpha}$ [WHILE $A_t$ $B_p$]=1 iff
"i=$i_1$ <$j_1$<..., <$i_m$ <$j_m$=j" is conditioned to "$i_1$, $j_1$, ..., $i_m$ $j_m$".
$V_{i_k}$, $j_k$, $\alpha$, [$A_t$]=1 and
$V_{i_k}$, $j_k$, $\alpha$, [$B_p$]=1
where "k" satisfies $1 \leq k \leq m$ ㉑ $V_{i,j,\alpha}$ [be $A_e$]=1 iff
$V_{i,j,\alpha}$ [nil $A_e$]=1

㉒ $V_{i,j,\alpha}$ [not $A<e^n$ $t>B<e^n>$]=1 iff
$V_{i,j,\alpha}$ [$A<e^n$ $t>B<e^n>$]=0

㉓ $V_{i,j,\beta}$ [#$A_{<et>}$]=
the number of elements of
$V_{i,j,\beta}$ [$A_{<et>}$]

㉔ $V_{i,j,\alpha,\beta}$ [sum $x_e$ $A_t$ $B_c$]=
sum of $B_c$ for all $x_e$ satisfying A

[3.3] Relation to Programming Concept

A basic concept of ordinary programming can be respectively positioned in this logical system organization as described below:

① Logical expression formula (wff): A consistent wff of a type "t" (propositional wff)

② Program: A consistent wff of a type "p" (act formula wff)

③ Program name: A constant of type "<$e^*p$>" or type "p"

④ Specification description (description of programming system): A consistent wff of a type "t" in the following.

$$(\uparrow C_p \equiv \uparrow D_p) \wedge ... \wedge$$
$$(\uparrow E_t \equiv \uparrow F_t) \wedge ...$$

⑤ A command "C" is written at the time of "i": A model constraint is also given as shown below.

$$\exists j \in I.(V_i, j, \alpha[C]=1)$$

where "C" is a constant of type <$e^n$ p> or type "p".
Specifying parameters of the command corresponds to determining the variable assignment function $\alpha$.

⑥ An execution of programming system: Under given model constraint, obtaining the model (solution) responsive to the given specification (axiom, theory).

[4] Sentence Structure and Meaning of Language L

The sentence structure of language L is one provided with "syntax-sugar" on the logic L as shown in the paragraph [3]. A syntax and semantics rule thereof is described in Appendix-1. Although a BNF rule is not written in the Appendix-1 for preventing complexity, various kinds of simplified expressions are allowed in a "where" type sentence. For example, the following two expressions are equal.

① for all.PEN:x where the.PEN:x=red for some.DESK:y where the.DESK:y=tall the.PEN:x=on-the.DESK:y ② all.red.PEN:x=on-some.tall.DESK:y

| Appendix-I Syntax and Semantics Rules |
|---|

```
<<Specification>> ::= <<Definition Row>>
<<Definition Row>> ::= <<Definition>> |
                       <<Definition Row:A>> <<Definition:B>>
                                 A_t ∧ B_t
<<Definition>> ::=
            ' <<Program Name:A>> ' ≡ <<Action: B>>  |
                        (↑A_p) ≡ (↑B_p)
        the. <<Noun:A>> : <<Variable:x>> ≡ <<Action:B>>  |
                        (☆ x_A) ≡ (↑B_p)
            <<Basic Proposition:A >> ≡ <<Proposition:B >>  |
                        (↑A_t) ≡ (↑B_t)
                << Basic Action:A >> ≡ <<Action:B>>
                        (↑A_p) ≡ (↑B_p)
<<Program Name>>  ::= << Part of Program Name >>  |
        <<Program Name>>  << Part of Program Name >>  |
<< Part of Program Name >>  ::=
                <<Character String>>  : <<Variable>>
<<Proposition >>  ::= <<Simple Proposition>>  |
                        ~( <<Proposition:A >> )  |
                                ~A_t
        <<Proposition:A >> and <<Proposition:B >>  |
                        A_t ∧ B_t
        <<Proposition:A >> or <<Proposition:B >>  |
                        A_t ∨ B_t
        <<Proposition:A >> → <<Proposition:B >>  |
                        A_t ∨ B_t
<<Simple Proposition>>  ::=  <<Basic Proposition >>  |
<<Simple Action >>
for <<Definitive Clause:E >>  <<Noun:A>>  :  <<Variable:x>>
        where <<Proposition:B >>  <<Proposition:C >>
                        E_<<e<e<tl>>> (x_A, B_t, C_t )
<<Basic Proposition >>  ::=
        true | false | <<Object:x_A >>  <<Descriptive >>
<< Basic Action >>                              <<Relation:R>>  |
                R_<el> (x_A) or ~ R_<el> (x_A ))
                <<Relation:R>>  ( <<Object:x_A >> )|
                R_<el> (x_A) or ~ R_<el> (x_A ))
        <<Object:x_A >>  <<Descriptive >>  <<Relation:R>>-
                                                <<Object:y_B>>  |
        R_<o<el> (x_A,y_B)or ~(R_<o<el> (x_A,y_B))
        <<Relation:R>>
                ( <<Object:x_A >> , <<Object:y_B>> )  |
                        R_<o<el> (x_A ,y_B)
                <<Relation:R>>  ( <<Object:x_A >> ,
                                <<Object:y_B>> , <<Object:z_c>> )  |
                        R_<o<o<el>>>(x_a, y_B, z_c)
        <<Object:x_a>>  <<Comparative:R >>  <<Object:y_a>>
                        R_<a<at>>
<<Action>>  ::= <<Simple Proposition:A>>  |
                        A_p
        DO( <<Simple Proposition:S_t >> )  |
            ⊙ (S_t) or      (if S is a basic Proposition)
        E_<o<o<o<et >>>( x_a, B_t, ⊙ (C_t ))
                        (if S=E( x_A, B_t, C_t))
        BE <<Proposition:A_t>>
                        | DO <<Row of Action:A >> END |
            ⊙ (A_t)
        REPEAT <<Number:C>>  <<Action:B>>  |
            REPEAT_<c <pp>> (C_c, B_p)
        WHEN <<Proposition:A >>  <<Action:B>>  |
            WHEN_<t<pp>> (A_t, B_p)
        WHILE <<Proposition:A >>  <<Action:B>>  |
            WHILE_<t<pp>> (A_t, B_p)
        UNTIL <<Proposition:A >>  <<Action:B>>  |
            WHILE_<t<pp>> (~A_t, B_p)
        IF <<Proposition:A >> THEN <<Action:B>>  |
            IF_<t<P<PP>>> (A_t, B_p, ⊙ (true))
        IF <<Proposition:A >> THEN <<Action:B>> ELSE
                                                <<Action:c>>
            IF_<t<P<PP>>> (A_t, B_p, C_p)
        <<Action:A>> and <<Action:B>>  |
                                <<Action:A>> or <<Action:B>>
                A_p and B_p              A_p or B_p
<<Row of Action >> ::= <<Action:A>>  |
                <<Row of Action:A >>  <<Action:B>>
                A_p                      A_p ⇨ B_p
<<Object>> ::= the. <<Noun:A>>  : <<Variable:x>>  |
```

-continued

Appendix-I Syntax and Semantics Rules

```
                    x_A
    the. <<Noun:A>>   :   <<Proper Noun:C>>  |
                    C_A
    <<Object:x_A>>  ..  <<Function:F>>  |
                    F_<Ab> x_A
    <<Function:F>> < <<Object:x_A>> >  |
                    F_<Ab> x_A
<<Relation>>  ::=  <<Relative>>  |  not- <<Relative>>
<<Definitive Clause >>  ::= all        |     some      |
    Π_<c⊲<lb>>> or Π_<c⊲<pp>>> Σ_<c⊲<ll >>> or
    Σ_<c⊲<pp>>> many. < <<Number:C>> >
    Θ_<c⊲c⊲ll >>> (C_c ) or Θ_<c⊲c⊲ll >>> (C_c )
<<Number>>  ::=  <<Numeral>>  | the.NUMBER: <<Variable>>  |
    # (  <<Noun:A>>   :   <<Variable:x>>   where
                                        <<Proposition:B >>  )  |
            #_<c⊲c>> (x_A, B_t)
    <<Number>> + <<Number>>  |  <<Number>> − <<Number>>  |
    <<Number>> * <<Number>>  |  <<Number>> / <<Number>>  |
    sign< <<Number>> >  |  abs < <<Number>> >
    sum < <<Noun:A>>   :   <<Variable:x>> where
            <<Proposition:B >> , <<Number:C>>  )
                sum_<c⊲<cc>>> (x_a, B_t, C_c)
<<Descriptive >>  ::= = | ≠
<<Comparative >>  ::= = | ≠ | ≦ | <
<<Definitive>>  ::= all | some | many | the
<<Noun>>  ::= THING | NUMBER | FUNC
                (the others also definable arbitrarily)
<<Relative>>  ::= by | to | in | at | of
                (the others also definable arbitrarily)
<<Numeral >>  ::= numerical strings
<<Proper Noun >>  ::= alpha-numerical strings with more
                     than two alphabets at their heads
<<Variable>>  ::= alpha-numerical strings with only
                  one alphabet at their heads
```

[5] Logic Synthesis in the Language L

[5.1] "Mechanism of Logic Synthesis" and "Binary Tree Expression of Program"

A logic synthesis of a program in language L is executed in such a manner that a term rewriting system rewrites a program expressed in a form of a binary tree, by utilizing a logic synthesis rule as a term rewriting rule. In the above, it becomes a base of the logic synthesis mechanism of language L that the program of language L is represented by the binary tree. Therefore, although apparent from the sentence structure rule of language L (or logic L), the program in language L which can be represented by the binary tree now will be described in the exercise as follows.

EXAMPLE

Program in Language L (Simplified Expression)

WHILE   some.bottle:b=in-some.storehouse:s   the.bottle:b=in-the.customer:k regular expression (WHILE(((Σ bottle:b) T)((Σ storehouse:s) T) ((in bottle:b) storehouse:s)))) (⊙((in bottle:b) customer:k))

Figure 4:
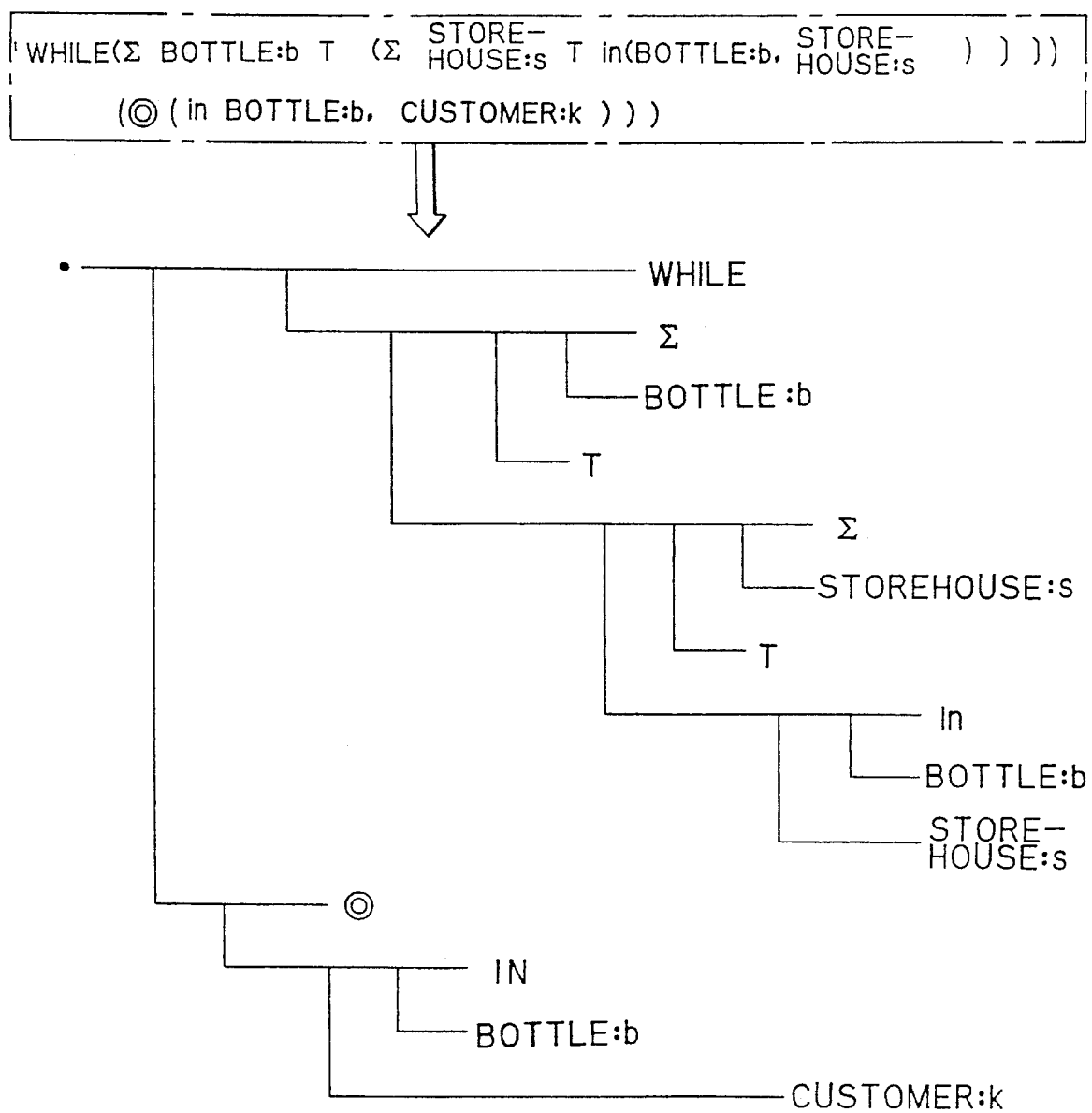
FIG. 4 is a diagram illustrating a binary tree which is an internal form of a language L as applied to the system of the present invention.

This binary tree expression is illustrated in FIG. 4. To represent the above regular expression in the binary tree is easily understood from FIG. 4.

Next, an application of the logic synthesis rule will be shown on the same exercise. The application example will be shown later.

Assuming that a following logic synthesis rule is proposed.

```
DO (the.X:x=in-the.customer:y)
=>
    DO
        the.X:x=in-the.customer:y
        the.X:x=(not-in)-all.storehouse:s
    END
```

This rule is intuitively meant by "that: a fact wherein the thing of "X" comes to be a relation of "in" with a customer "y", indicates at the same time such an "X" as becomes no relation of "in" with any storehouse; if the descriptive portion wherein the "X" having a relation of "in" with the customer "y" is found, a relative portion of the description should be rewritten such that the "X" has no relation of "in" with any storehouse".

The above described rule can be rewritten to the regular expression (approximated form to the regular expression as follows.

```
( ⊙ ((in X:x) customer:y))=>
    ((⇨( ⊙  ((in X:x)  customer:y)))
        ((( Π storehouse:s) T)
            ( ⊙ (((not(in))X:x)  storehouse:s))))
```

Since the same description as the left side in formula of this rule is in the original program, the description in the program is now replaced by the right side of this rule. Then, the variable "X", "x", and "y", are unified with the "bottle", variable "b", and variable "k" respectively.

That is, in the original program:

(⊙((in bottle:b) customer:k))

is rewritten as:

---

((⇨( ⊙ ((in bottle:b) customer:k)))
    ((( Π storehouse:s) T)
    ( ⊙ (((not(in)) bottle:b) storehouse:s)))).

---

The obtained program is represented by the binary tree as is in the foregoing as follows.

Figure 5:
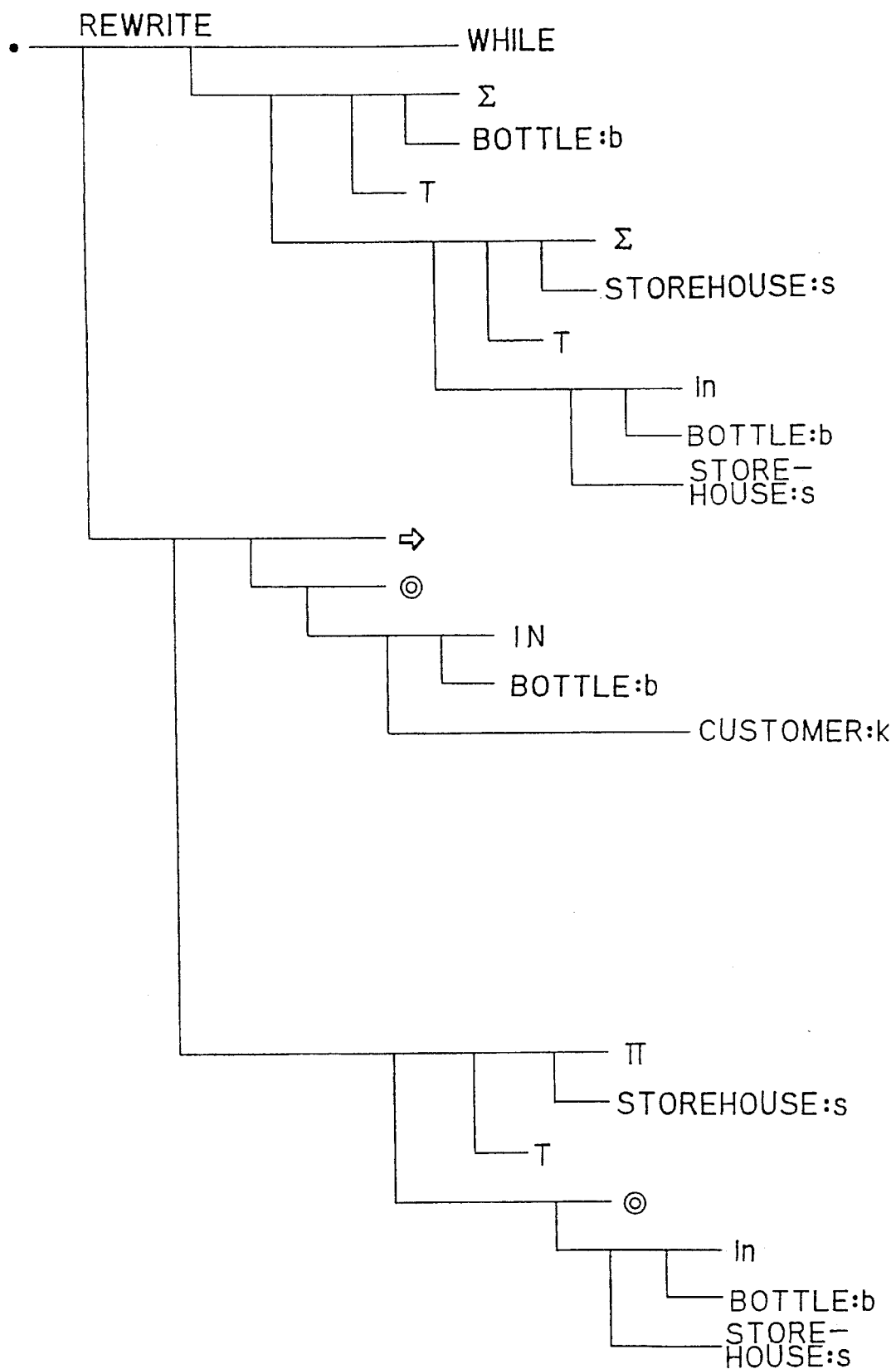
FIG. 5 is a diagram illustrating an example of a binary tree which is written in accordance with a logic synthesis rule.

In other words, the binary tree as is shown in FIG. 4 is converted to another binary tree shown in FIG. 5 in accordance with a logic synthesis rule.

[5.2] Logic Synthesis Rule for conjunction, Logic Operative, Logic Quantifier

Language L, as a standard, contains a logic synthesis rule of such as the conjunction, logic operative, logic quantifier. In more detail, the logic synthesis rule erases the conjunction, logic operative, logic quantifier, and the like from language L to replace them with an intermediate language expression which becomes an input to an object language extender. This rule is applied to certainly repeat the above operation while the pattern to be applied is being found.

---

RB1 : Negation Erase (Propositional Formula)

```
IF ~ S            =>    IF S
  THEN P                  THEN Q
  ELSE Q                  ELSE P
     where this expression is limited to a case
     that R is a basic adjective.
```

RB2 : ∧ Erase (Propositional Formula)

```
IF S ∧ T          =>    IF S
  THEN P                  THEN
  ELSE Q                    IF T
                              THEN P
                              ELSE Q
                          ELSE Q
```

RB3 : ∨ Erase (Propositional Formula)

```
IF S ∨ T          =>    IF S
  THEN P                  THEN P
  ELSE Q                  ELSE Q
                          IF T
                             THEN P
                             ELSE Q
```

RB4 : → Erase (Propositional Formula)

```
IF S → T          =>    IF ( ~S) ∨ T
  THEN P                  THEN P
  ELSE Q                  ELSE Q
```

RB5 : all Erase (Propositional Formula)

```
IF Π  A:x  B  C   =>    truth:=1
  THEN P                FORALL(A:x)
  ELSE Q                  IF B → C
                             THEN noop
                             ELSE
                                DO
                                  truth:=0
                                  break
                                END
                          IF truth=1
                             THEN P
                             ELSE Q
```

Expression "(A:x)" is another expression form for "$X_a$", and hereinafter this refers to the same.

---

RB6 : some Erase (Propositional Formula)

```
IF Σ A:x  B  C    =>    truth:=0
  THEN P                FORALL(A:x)
  ELSE Q                  IF B ∧ C
                             THEN
                                DO
                                  truth:=1
                                  break
                                END
                             ELSE noop
                          IF truth=1
                             THEN P
                             ELSE Q
```

RB7 : many Erase (Propositional Formula)

```
IF Θ (n)  A:x  B  C =>  count:=0
  THEN P                FORALL(A:x)
  ELSE Q                  IF B ∧ C
                             THEN
                                count:=count+1
                             ELSE noop
                          IF count ≧ n
                             THEN P
                             ELSE Q
```

RB8 : all Erase (Act Formula)

```
Π  A:x  B  P       =>   FORALL(A:x)
                           IF B
                             THEN   P
```

RB9 : some Erase (Act Formula)

```
Σ  A:x  B  P       =>   FORALL(A:x)
                           IF B
                             THEN
                                DO
                                  P
                                  break
                                END
                             ELSE
                                noop
```

RB10 : many Erase (Act Formula)

```
Θ (n)  A:x  B  P   =>   count:=0
                        FORALL(A:x)
                           IF count ≦ n
                             THEN
                                IF B
                                  THEN
                                     DO
                                       P
                                       count:=count+1
                                     END
                                  ELSE
                                     noop
                             ELSE
                                break
```

RB11 : REPEAT Extension

```
REPEAT n P         =>   count:=1
                        REPEAT ∞
                           IF count ≦ n
                             THEN
                                DO
                                  P
                                  count:=count+1
                                END
                             ELSE
                                break
```

RB12 : WHEN Erase

```
WHEN    A  P       =>   REPEAT ∞
                           DO
```

Remarks

-continued

```
                          IF A
                          THEN
                              DO
                                  P
                                  break
                              END
                          ELSE
                              DO
                                  post
                                  unlock
                                  wait
                                  lock
                              END
                          END
         RB13 : WHILE    Erase
WHILE A P         ==>    REPEAT∞
                          DO
                              IF A
                              THEN
                                  DO
                                      P
                                      post
                                      unlock
                                      wait
                                      lock
                                  END
                              ELSE
                                      break
                          END
         RB14 : UNTIL    Erase
UNTIL A P         ==>    WHILE(~A) P
         RB15 : WHEN Syntagmatic
WHEN A P          ==>    WHEN A ∨ B
or WHEN B Q              IF A
                         THEN P
                         ELSE Q
         RB16 : and (Act Formula) Erase
P_P and Q_P       ==>    P_P    Q_P
```

Remarks

Although the above conversion expression results in distortion of the meaning of "and", the distortion may be in an allowable range in view of the operation. An implementation such as can be performed correctly along with the meaning of "and", will be available.

[5.3] Base Formula Extension Rule to Intermediate Language

There is described as follows an extension rule for extending into an intermediate language the base formula in a language L program wherein the application of the logic synthesis rule thereto has been terminated. The application of the rule is described in [5.2].

```
         RD1-1 : Base Formula Extension
         (General Propositional Formula, Term 1)

IF     R(A:x)        ==>       check(1,R,A,x)
   THEN P                         IF rtn=1
   ELSE Q                         THEN P
                                  ELSE Q
```

Where R is limited to a case of a basic adjective.

```
         RD1-2 : Base Formula Extension
         (General Propositional Formula, Term 2)

IF     R(A:x, B:y)   ==>       check(2,R,A,B,x,y)
   THEN P                         IF rtn=1
   ELSE Q                         THEN P
                                  ELSE Q
```

Where R is limited to a case of a basic adjective.

```
         RD2-1 : Base Formula Extension
         (General Act Formula, Term 1)

⊙     R(A:x)         ==>       do(1,R,A,x)
```

Where R is limited to a case of a basic adjective.

```
         RD2-2 : Base Formula Extension
         (General Act Formula, Term 2)

⊙     R(A:x, B:y)    ==>       do(2,R,A,B,x,y)
``` where R is limited to a case of a basic adjective, and is the same as in the case of the adjective on or after term 3.

```
         RD3-1 : Base Formula Extension
         (General Negation Act Formula)

⊙ ( ~(R (A:x))       ==>       undo(1,R,A,x)
``` where R is limited to a case of a basic adjective.

```
         RD3-2 : Base Formula Extension
         (General Negation Act Formula, Term 2)

⊙ ( ~(R (A:x, B:y))  ==>       undo(2,R,A,B,x,y)
``` where R is limited to a case of a basic adjective, and is the same as in the case of the adjective on or after term 3.

```
         RD4 : Base Formula Extension
         (Real Existence Act Formula)

⊙ (be (A:c))         ==>       makec(A,c)
         RD5 : Base Formula Extension
         (some Real Existence Act Formula)

⊙ ( Σ A:x (be (A:x)))  ==>     name(x)
                                  makex(A,x)
         RD6 : Base Formula Extension
         (Direct Specific Non-Real-Existence Act Formula)

⊙ ( nil  (A:c))      ==>       unmakec(A,c)
         RD7 : Base Formula Extension
         (Demonstrative Specific
         Non-Real-Existence Act Formula)

⊙ ( nil  (A:x))      ==>       unmakex(A,x)
         RD8-1 : Function Extension
         (Propositional Formula, Term 1)

IF R (F <A:x>)                 THEN P ELSE Q
                        ==>
                                  find(F,A,x,v)
                                  IF R (V:v )
                                  THEN P
                                  ELSE Q
``` where R is a basic adjective.

---

RD8-2 : Function Extension
(Act Formula, Term 1)

⊙ ( R (F <A:x>)) ==> find(F,A,x,v)
⊙ ( R (V:v ))

where R is a basic adjective.

RD8-3 : Function Extension
(Propositional Formula, Term 2)

IF R (F <A:x>, B:y)        THEN P ELSE Q
==>  find (F,A,x,v)
     IF R (V:v, B:y)
                           THEN P
                           ELSE Q

--- where R is a basic adjective.

A rule with a parameter position of R reversed is provided (omitted in this description).

---

RD8-4 : Function Extension
(Act Formula, Term 2)

⊙ ( R (F <A:x>, B:y))
==>  find(F,A,x,v)
     ⊙ ( R (V:v, B:y))

--- where R is a basic adjective.

A rule with a parameter position of R reversed is provided (omitted in this description).

The foregoing is the same as in the case on or after term 3, and as in the case of ~R instead of R.

---

RD10 : some. FUNC Erase

Σ FUNC:f A P  ==>   makefunc(f)
                    REPEAT ∞
                    DO
                      ⊙ A
                      checkdef(f)
                      IF rtn=1
                         THEN
                           DO
                             P
                             break
                           END
                         ELSE noop
                    END Example ] Fibonacci Function
FOR some.FUNC:f  ==>  makefunc(FUNC,f)
where                 REPEAT ∞
f<0>=1 and            DO
f<0>=1 and              DO
for all.NUMBER:x          f<0>=1 and
f<x+2>=f<x+1>+f<x>        f<1>=1 and
FOR the. NUMBER :a        FOR all.NUMBER:x
f<a>=answer                 f<x+2>=f<x+1>+f<x>
                        END
                        checkdef(FUNC,f)
                        IF rtn=1
                           THEN
                             DO
                               FOR the.NUMBER:a
                                 f<a>=answer
                                 break
                             END
                           ELSE noop
                      END RD10-1 : DO(A ∧ B) Extension
(or⊙ (A ∧ B) Extension)

DO( $A_t$ ∧ $B_t$ )  ==>  DO <A> and DO(B)

RD10-2 : DO(A→B) Extension
(or⊙ (A→B) Extension)

---

DO( $A_t$ → $B_t$ )  ==>  IF A THEN B ELSE noop

Remarks

RA10, RA10-1, and RA10-2 are used for extending into an executable procedure the mathematical logic function which has been declaratively defined.

---

RD11 : Process Lock Aquisition . Release $C_P$ ≡        ==>    $C_P$ ≡
$P_P$                  DO
                         lock
                         $P_P$
                         post
                         unlock
                       END

---

[5.4] Logic Synthesis Execution Example

The application example with respect to the logic synthesis rule described in the foregoing will be shown as follows. In the explanation, symbol ● indicates a part (output) which has been generated or converted by the logic synthesis step just before, and ○ indicates a part (input) to which the logic synthesis rule is applied on the logic synthesis step just after.

---

Exercise program ≡
  REPEAT n
    WHEN some. (of-the. brand:m).bottle:b
              =in-some. storehouse:s
      the.bottle:b=in-some. customer:k
    DO(the.bottle:x=in-the.customer:y) ≡
      DO(the.bottle:x=not-in-all.storehouse:y) --- ①

Logic Synthesis Progress

Program ≡
  REPEAT n
    WHEN some.(of-the.brand:m).bottle:b
              =in-some. storehouse:s
      the.bottle:b=in-some. customer:k
------------------------------------------------- (only transformed
into an approximated type to the regular sentence
structure.)
Program ≡
  REPEAT n
    WHEN for some. bottle:b where the. bottle:b
                =of-the.brand:m
         for some.storehouse:s
              the.bottle:b=in-the.storehouse:s
      FOR some.customer:k
         the.bottle:b=in-the.customer:k
------------------------------------------- (the aforegoing ①
is applied as a rewriting rule.)
Program ≡
  REPEAT n
    WHEN for some.bottle:b
         where the.bottle:b=of-the.brand:m
         for some. storehouse:s
              the.bottle:b=in-the. storehouse:s
         FOR some.customer:k
●   ○        the.bottle:b=not-in-all.storehouse:s
------------------------------------------------- (only transformed
into an approximated type to the regular sentence
structure.)
Program ≡
  REPEAT n
    WHEN for some.bottle:b
         where the.bottle:b=of-the.brand:m
         for some. storehouse:s
              the.bottle:b=in-the.storehouse:s
         FOR some. customer:k
●            FOR all.storehouse:s the.bottle:b=not-in-the.storehouse:s

---

(RD11 is applied )
Program ≡
- lock
  REPEAT n
  ○ WHEN for some.bottle:b
          where the.bottle:b=of-the.brand:m
                for some.storehouse:s
                  the.bottle:b=in-the.storehouse:s
          FOR some.customer:k
            FOR all.storehouse:s
              the.bottle:b=not-in-the.storehouse:s
- post
- unlock

---

( RB12 is applied)
Program ≡
  lock
  ○ REPEAT n
- REPEAT ∞
- ○ IF for some.bottle:b
  ○   where the.bottle:b=of-the.brand:m
- ○     for some.storehouse:s
- ○       the.bottle:b=in-the.storehouse:s
- THEN
-   DO
  ○     FOR some.customer:k
  ○       FOR all.storehouse:s
            DO
              the.bottle:b=not-in-the.storehouse:s
            END
-   ELSE
-     DO
-       post
-       unlock
-       wait
-       lock
-     END
  post
  unlock

---

(RB11, RB9, and RB6 are applied)
Program ≡
  lock
- count:=1
- REPEAT ∞
-   IF count ≤ n
-   THEN
-     DO
        REPEAT ∞
          truth1=0
-         FORALL.(bottle:b)
- ○         IF the.bottle:b=of-the.brand:m
-           THEN
-             DO
                truth2=0
                FORALL.(storehouse:s)
- ○               IF the.bottle:b=in-the.storehouse:s
-                 THEN
-                   DO
-                     truth2=1
-                     break
-                   END
-                 ELSE
-                   noop
-                 IF truth2=1
-                 THEN
-                   DO
-                     truth1=1
-                     break
-                   END
-                 ELSE
-                   noop
-             ELSE
-               noop
-           IF truth1=1
-           THEN
-             DO
-               FORALL.(customer:s)

- DO
-   FORALL.(storehouse:s)
      DO
○       the.bottle:b=not-in-the.storehouse:s
      END
-   break
- END
- break
- END
  ELSE
  DO
    unlock
    wait
    lock
  END
- count:=count+1
  END
  ELSE
    break
  post
  unlock

---

(RD1-1, RD3-2 are applied)
Program ≡
  lock
  count:=1
  REPEAT ∞
    IF count ≤ n
    THEN
      DO
        REPEAT ∞
          truth1=0
          FORALL.(bottle:b)
            DO
-             check(2,of,bottle,brand,b,m)
-             IF rtn=1
-             THEN
                DO
                  truth2=0
                  FORALL.(storehouse:s)
                    DO
-                     check(2,in,bottle,
                          storehouse,b,s)
-                     IF rtn=1
-                     THEN
                        DO
                          truth2=1
                          break
                        END
                      ELSE
                        noop
                    END
                  IF truth2=1
                  THEN
                    DO
                      truth1=1
                      break
                    END
                  ELSE
                    noop
              ELSE
                noop
            END
          IF truth1=1
          THEN
          DO
            FORALL.(customer:k)
              DO
                FORALL.(storehouse:s)
                  DO
-                   undo(2,in,bottle,storehouse,b,s)
                  END
                break
              END
            break
          END
          ELSE
          DO
            unlock
            wait

```
        lock
      END
   count:=count+1
   END
 ELSE
  break
post
unlock
```

The example described in the foregoing is the result of the logic synthesis processing. In this step, it is apparent that the result shows the conventional language level, that is, the description level of the computer-directed language.

[6] Extension to Object Language

[6.1] Procedure Extension (Intermediate Instruction and Intermediate Sentence Structure)

The program outputted as a result of the logic synthesis which is disclosed in [5], is constituted only with the intermediate instruction and the intermediate sentence structure in language L processing system (this is apparent in that the logic synthesis rule group described in chapter [5] and the term rewriting system accommodated within language L processing system, both continue the rewriting operation by utilizing these rules as a rewriting rule while any of these rules can be kept being applied). Therefore, if these intermediate instruction and sentence structures are completed in the form of respective object language and object systems, the extension to the object language in connection with the procedure part is achieved. As described in [6.2], since the data definition which is required by the procedure part as extended to the object language is generated on the basis of the program obtained from the same logic synthesis result, no difference arises between the procedure part and the data definition part.

[6.1.1] Intermediate Instruction

① countup(x) or x:=x+1

Function: (the same as in the ordinary program language, accordingly omitted)

② truth(x.1) or x:=1 truth(x.0) or x:=0

Function: (the same as in the ordinary program language, accordingly omitted)

③ check(1,R,A,x)

Function: the first, a chain of table A with a start point of THINGS-A field in table THINGS is traced, and table A having the same address as that shown by "x" is intended to be found. If such table A is found, and field A–R value of the table A is "1", then a value "1" is set in return code domain "rtn", and if the field A–R value of the table A is not "1", zero is set in the domain.

④ check(n,R,A1, . . . ,An,x1, . . . ,xn)

Function: If A1–An is not NUMBER, a chain of relation cell with a start point of RELATIONS-R field in table RELATION is traced, and then if any of each value of from CELLn-1 field through CELLn-n field is found to equal that of "x1" through "xn" within a group of these relation cells, a value "1" is set in return code domain "rtn", and if not, zero is set in the region.

If A1–An is NUMBER, an establishment of R(x1, . . . ,xn) is checked. If R(x1, . . . ,xn) is established, a value "1" is set in return code domain "rtn", and if not, zero is set in the domain.

⑤ do(1,R,A,x)

Function: A chain of table A with a start point of THINGS-A field in table THINGS is traced, and table A having the same address as that shown by "x" is intended to be found. If such table A is found, than a value "1" is set in the field A–R of the table A. If such table A is not found, no operation is made.

⑥ do(n,R,A1, . . . ,An,x1, . . . ,xn)

Function: If A1–An is not NUMBER, a storage region for the relation cell of term "n" type is newly secured, that is, the new cell is connected to a chain of the relation cell with a start point of RELATIONS-R field in table RELATION. The values of from "x1" through "xn" are written in from CELLn-1 field through CELLn-n field of that relation cell, where before executing the foregoing process a "check(n, R,A1, . . . ,An,x1, . . . ,xn)" is performed and if its result is "rtn=1", then no operation is performed.

If A1–An is NUMBER, then a suitable value is taken out from constants in "x1–xn" and from already determined variables, and the suitable value is given to the only variable which is not yet determined, so as to establish the condition of "R(x1, . . . , xn)". If the variables not yet determined are found in the number equal to or more than 2, no operation is performed.

⑦ undo(1,R,A,x)

Function: A chain of table A with a start point of THINGS-A field in table THINGS is traced, and table A having the same address as that shown by "x" is intended to be found. If such table A is found, a value zero is set in the field A–R of the table A. If such table A is not found, no operation is made.

⑧ undo(n,R,A1, . . . ,An,x1, . . . ,xn)

Function: A chain of relation cells with a start point of RELATIONS-R field in table RELATION is traced, and if any of each value of from CELLn-1 field through CELLn-n field is found to equal to that of "x1" through "xn" within a group of these relation cells, then such relation ell is removed from the chain, and the relation cell domain is returned. If a corresponding relation cell is not found on the chain, no processing is made.

⑨ makec(A.c)

Function: A storage domain for a table A is newly secured, and such a new table A is connected into the chain of the table A with a start point of THINGS-A in table THINGS. The generated new character row is written in the A-NAME field of the table A.

If the table A having a character row "c" in A-NAME field exists on the corresponding chain, no operation is made.

⑩ unmake(A,c)

Function: A chain of table A with a start point of THINGS-A field in table THINGS is traced, and table A with a character row "c" written in A-NAME field is intended to be found. Such table A is removed from the chain, and a storage domain for the table A is returned. If such table A is not found on the chain, no operation is made.

⑪ makex(A,x)

Function: First, a character row is generated wherein uniqueness is proved as a proper name of individual. A storage domain for a table A is newly secured, and such a new table A are connected into the chain of the table A with a start point of THINGS-A in table THINGS. The generated new character row is written in the A-NAME field of the table A. An address of the table A is finally effected as an entry to "x".

⑫ unmakex(A,x)

Function: A chain of table A with a start point of THINGS-A field in table THINGS is traced, and table A having the same address as that shown by "x" is intended to be found. If such table A is found, the table A is removed from the chain, and a storage domain for the table A is returned. If such table is not on the chain, no operation is made.

⑬ find(F,A,x,y)

Function: If A is not NUMBER, a chain of table A with a start point of THINGS-A field in table THINGS is traced, and table A having the same address as that shown by "x" is intended to be found. If such table A is found, a value of field A–F of the table A is set on "y". If such table A is not found, value zero is set on "y".

If A is NUMBER, and F is a function variable, then another value which has been written in a relative position "x" (contents of x is the value) of a mathematical function table in address designated by the contents, is written in "y".

If A is NUMBER, and F is a function constant ("abs," "sign," and the like), then a result obtained by applying F to the contents of "x" is set as contents of "y".

⑭ makeproc(A)

Function: A process is newly produced, and a start point of the process is positioned at the head of the program system which now is used.

⑮ call(n,R,A1, . . . ,An,x1, . . . ,xn)

Function: A component program corresponding to a combination (An,x1, . . . ,xn) is called, and "x1, . . . ,xn" are parameters for calling the component program.

⑯ makefunc(F,f)

Function: A domain of the table F of the mathematical logic function is secured, and a numeral value field therein is all initially set in undefined. The address of the secured domain is written in "f".

⑰ checkdef(A,f)

Function: If a numeral value field of the table F of the mathematical logic function specified by the contents of "f" is not completely undefined, then value "1" is set in a return code domain "rtn", and otherwise zero is set in the domain "rtn".

⑱ =(x,y) or x=y

Function ()same as in the case of an ordinary program language, and therefore hereunder omitted)

⑲ <(x,y) or x<y

Function: (same as in the case of an ordinary programming language, and thus hereunder omitted)

⑳ ≦(x,y) or x≦y

Function: (same as in the case of an ordinary programming language, and thus hereunder omitted)

㉑ wait

Function: The executing right of a process (task) which is an executing subject of this "wait" sentence, is temporarily abandoned, and a program executing point of the process is transferred to just behind the "wait" sentence.

㉒ post

Function: The executing right is given to all the processes (tasks) which temporarily abandoned the right.

㉓ lock

Function: While the executing right is not being occupied by any other processes, the right is forced to be occupied by the executing process of that "lock" sentence. If the executing right is being occupied by any other processes, the executing right of the executing process of such "lock" sentence is forced to temporarily be abandoned, and the executing process of the lock sentence is kept behind waiting to occupy the executing right. In this case, if the executing process of the "lock" sentence itself has already occupied the right, no operation is made.

㉔ unlock

Function: When the executing process of the "unlock+ sentence has already had the executing right, the right is released, and any one of the processes which is kept waiting to occupy the executing right is forced to occupy the right, and the right is given to that one process. If the executing process of the "unlock" sentence has no executing right, no operation is made.

[6.1.2] Intermediate Sentence Structure

① Juncture

Function: (same as in the case of an ordinary program language, and therefore hereunder omitted)

② If—THEN—ELSE

Function: (same as in the case of an ordinary program language, and therefore hereunder omitted)

③ REPEAT∞P

Function: An execution for P is repeated at infinity. If a "break" sentence is executed in P, to repeat the execution for P is discontinued.

④ FORALL.(A:x) P

Function: If A is a common noun except NUMBER, then while a chain of table A with a start point of THINGS-A field in table THINGS is being traced, the operation wherein P is executed every time after addresses of respective table A are set in "x" is repeatedly performed with respect to all the table A on the chain.

If A is NUMBER, P is executed with a value zero written in "x", and further . . . is performed until the value "x" reaches a specified value.

In any of the above cases, when a "break" sentence appears in P, the repeated operations described in the foregoing are sometimes discontinued before the execution of P with respect to all the table A.

It should be noted that the value "x" at the time of receiving the continuous operation of "FOR all" makes possible the function of the indicative in language L.

⑤ break

Function: Through escaping from REPEAT inside at most and a loop of "FOR all:A:x" including this "break" sentence, the program executing point is transferred to just behind the loop.

⑥ noop

Function: Without executing any, the program executing point is transferred to the sentence just behind the "noop" sentence.

[6.2] Generating Data Definition Port

Based on the program outputted from the result of the logic synthesis which has been described in [5.1] and [5.2], a data definition group is generated so as to satisfy the following condition.

① Table base is defined.

② Table THINGS and table RELATION are included in BASE.

③ Table CELL2, CELL3, CELL4, and CELL5 are defined. Field CELLn-NEXT and CELLn-TERM1, and field CELLn-TERM2, . . . field CELLn-TERMn are defined in table CELLn.

④ check(1,R,A,x) or do(1,R,A,x) or undo(1,R,A,x) appears on a program. When A is neither NUMBER nor FUNC, Field of THINGS-A is defined in table THINGS, and table A is defined, and field A-NAME and field A-NEXT and field A-R are defined in field A.

⑤ In the case that check(2,R,A,B,X,Y) or do(2,R,A,B, X,Y) or undo(2,R,A,B,X,Y) appears on a program, and A and B respective is neither NUMBER nor FUNC, field of THINGS-A is defined in table THINGS, and field of THINGS-B is defined in table THINGS, and table A is defined, and field B-NAME and field A-NEXT are defined in table A, and table B is defined, and field B-NAME and field B-NEXT are defined in table B, and field of RELATIONS-R is defined in table RELATIONS.

⑥ Further, in general, the case where check(n,R,A,B,X,Y) or do(n,R,A,B,X,Y) or undo(n,R,A,B,X, Y) appears on a program, is to be the same as shown in ⑤.

⑦ When find(F,A,x,y) appears on a program and A is not NUMBER, table A is defined, and field A–F is defined in Table. a ⑧ When make(A,c) or unmake(A,c) appears on a program, table A is defined, and field A-NAME and field A-NEXT are defined in table A.

⑨ The mathematic logic function tables FUNC and FUNC2 are continuously defined. A four-byte-length numerical field is defined in the number of n in table FUNC.

A four-byte-length numerical field is defined in the number of "n×n" in table FUNC2. ("n" is determined in each language L processing system.)

Figure 6:
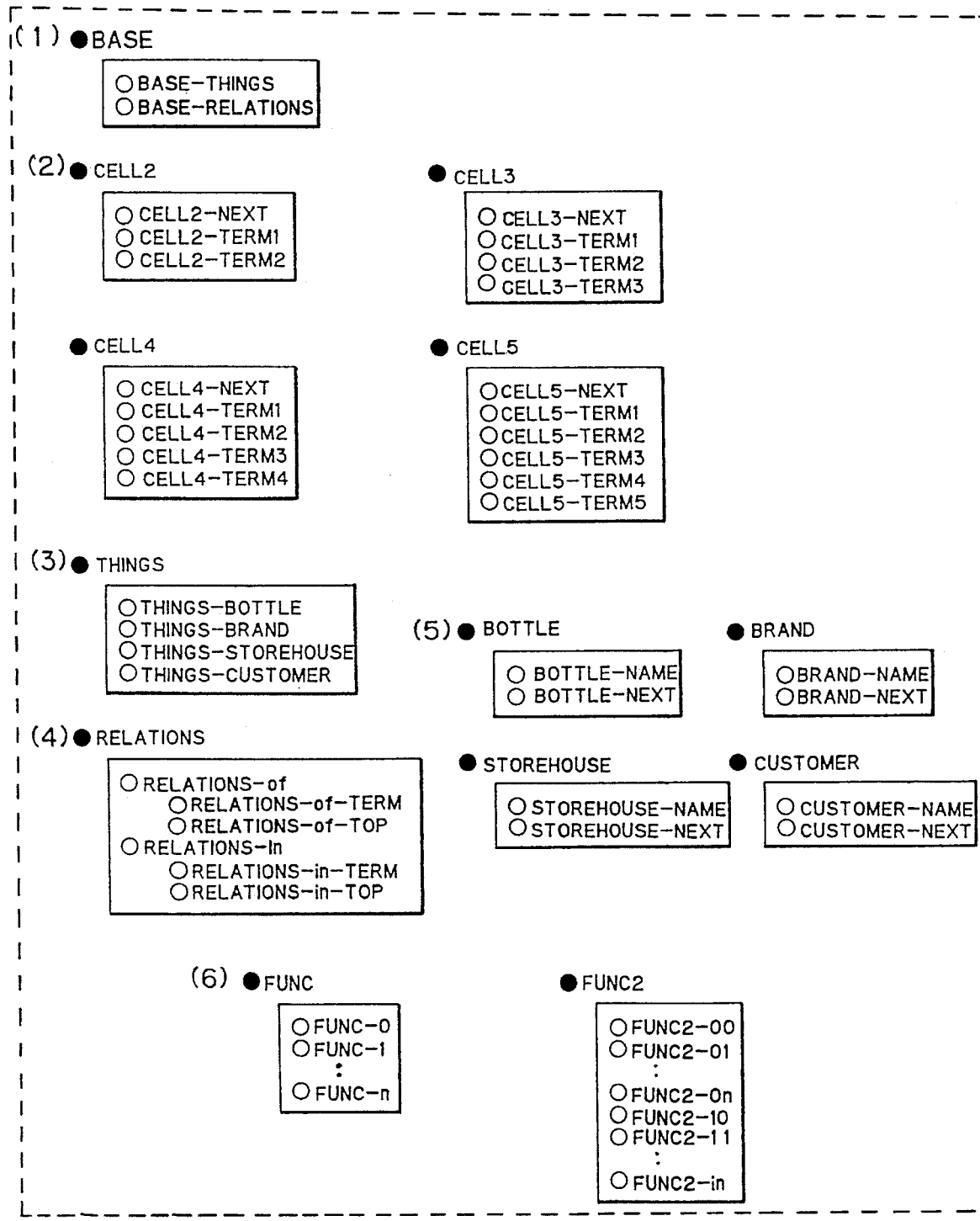
FIG. 6 is an example of a table definition as applied to the system of the present invention.

FIG. 6 is an example illustrating a table definition based on the data definition generated in the embodiment according to the present invention.

In FIG. 6, ● indicates table, ○(B) below ●(A) shows field B in table A, and ○(D) below ○(C) shows subfield D of field C, respectively.

These are a table group generated on the basis of the rule described in the previous paragraph, in particular, FIGS. (3) through (5) are the table group which have been defined by the exercise programs raised in [5.4]. Since this example does not use a term 1 adjective, a field except NAME and NEXT is unexpectedly not defined with respect to the bottle, brand, storehouse, and customer.

Figure 7:
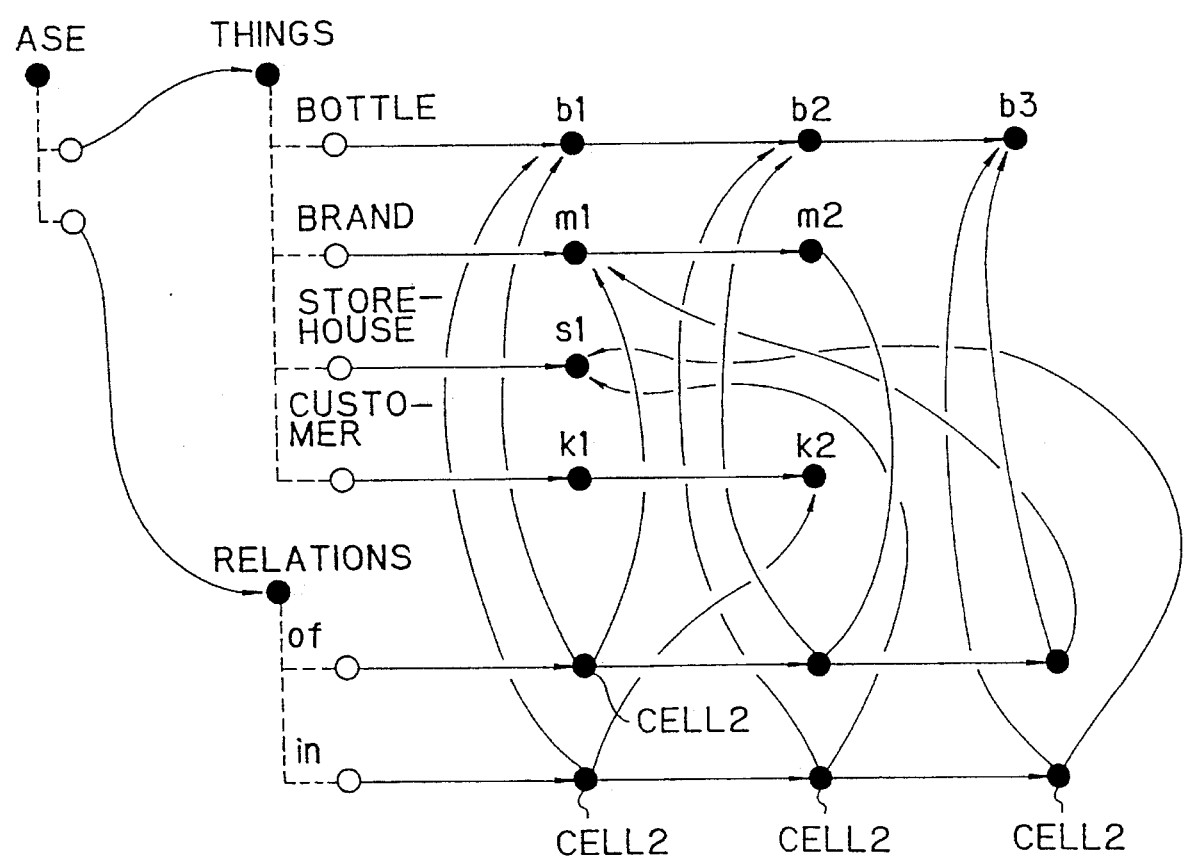
FIG. 7 is an example for setting a table relation applied to the system of the present invention.

After definition of the above mentioned table and field, and when programs are actually executed and for example the following situation is completed, then the state of the table will be shown as in FIG. 7.

SITUATION EXAMPLE

① bottles exist in the symbols of "b1" through "b3", brand of "b1" and "b3" is "m1", and brand of "b2" is "m2";

② storehouse exists only one in the symbol of "s1";

③ customers are Mr. k1 and Mr. k2, in the number of two;

④ bottle "b1" was sold to Mr. k2, the rest of the bottles are in storehouse "s1", as is apparent from FIG. 7, bottle "b1" is combined with brand "m1" by "of" relation, and with customer "k2" by "in" relation.

[7] Language L Executor the object language extension program outputted through use of the logic synthesis and object language extension in language L, can immediately be executed under the language L executor by compiling that program (if the extension as to the head point of the program at the time of the object language extension is replaced by the contents of the intermediate instruction for control such as "post," "wait," then the operation can be achieved even on an optional object system except the language L executor.)

Figure 8:
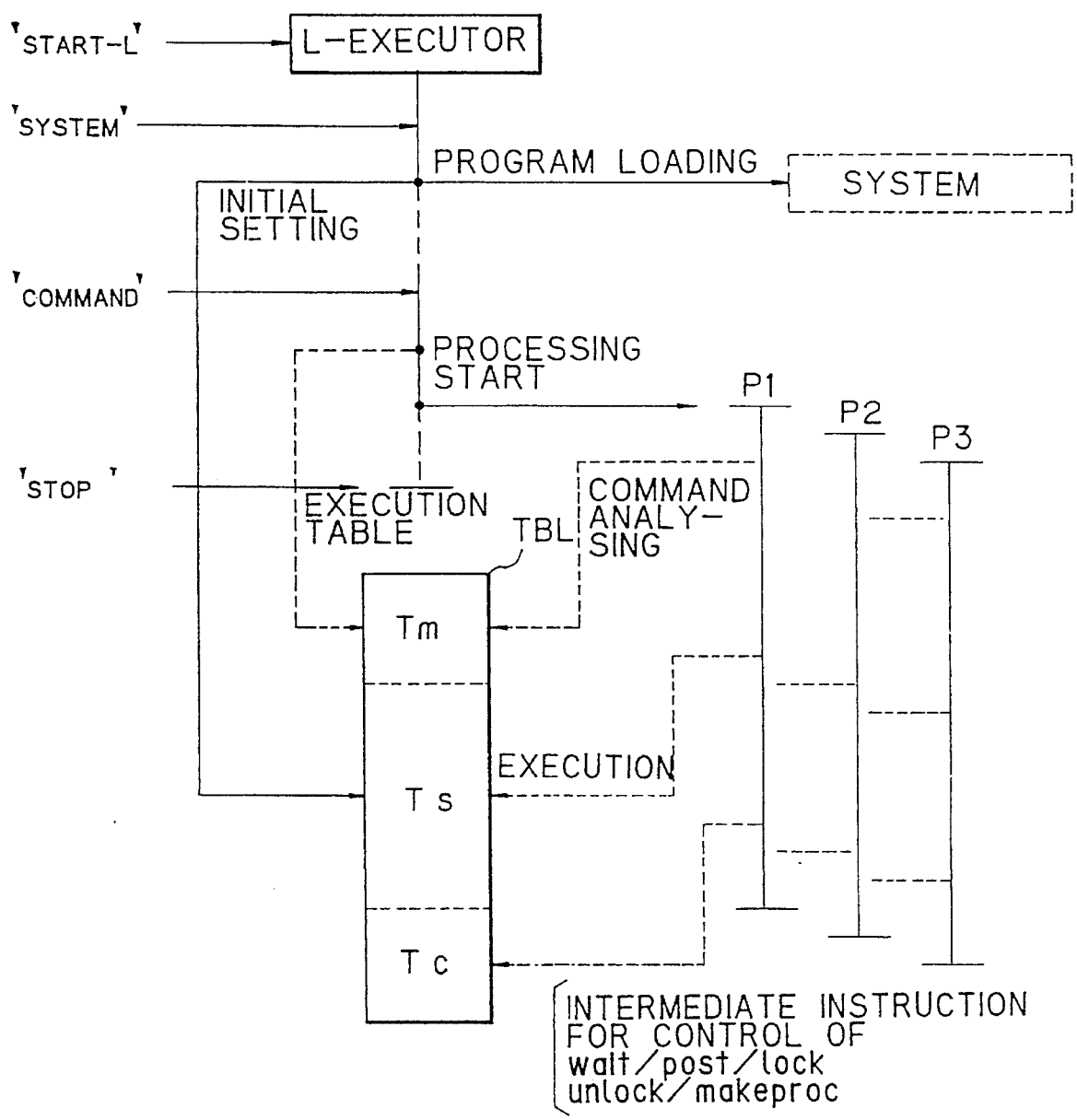
FIG. 8 is a diagram illustrating an executor as applied to the system of the present invention.

The language L executor and in addition an execution form of each program system under the language L executor are shown in FIG. 8. A procedure of execution is as follows.

① The first, by START-L command, the language L executor (L-Executor) is started.

The started L-Executor is so constituted as to always read the data (that is, command) from the external until a STOP command is given.

② Next, a name of the program system to be executed enters as a command.

When the command is inputted, L-Executor performs two processes as follows.

③ then, every time a command (except STOP) is given, L-Executor performs as follows.

(i) The program system is made loading from within the program file which the language L system holds.

(ii) En executing table TAB is prepared, and subjected to the initialization processing. This executing table is only one set prepared for the program system to now be executed. The executing table comprises a command buffer area (Tm in FIG. 8), a control region (Tc) utilized by the control use intermediate instructions such as "wait/post", "lock/unlock", and a state storage area (Ts) wherein an execution object program always surveys and reads during its running.

In this manner, an execution environment of the object storage program system has come to be completed.

(i) The command data to has been read is transcribed as is in the command buffer area within the execution table, and thus one process which makes an executing start point in connection with the head point of the object program system is generated. That is, it should be noted that every time one command for the object program system is inputted, a new process is generated. Therefore the command execution can be performed always in parallel with each other. In this process, when respective processes are finished, then the processes are automatically erased.)

④ The program an operation of which has been started as a process, counts out the command buffer area within the execution table, analyzes the command, transfers a control to a program segment responsive to the command, and in addition delivers parameters thereto (these processes are already accommodated in a head point of the program at the time of extension of the object language).

⑤ In this manner, although the object program system simultaneously continues the operation under a plurality of processes, in the operation process, the check of and writing into a single execution table are performed respectively. Synchronous control and transmission between processes are performed via this execution table.

The above described executor of language L itself shows a typical operating system form provided with a minimum function on which the language L program can be executed, and as in the foregoing, the executor, apart from the above typical case, can be operated even on a desired object system.

In this connection, the exercises written in language L wherein an accurate operation has been confirmed, will be shown in the following table. The number of lines for description in the table shows the number of lines of language L required for describing the exercises. The number of lines for extension in the table is one in language C when the program of language L is finally extended to that of the language C.

| No. | Problem | Contents | the Number of Lines in Language: | |
|-----|---------|----------|---------|---------|
| | | | L Description | C Extension |
| 1 | Maze | Escaping from the maze laid out as desired. | 43 | 605 |
| 2 | Philosophers and Dinner | Five philosophers seated round table take a dinner, scrambling forks. | 43 | 371 |
| 3 | Package Router | A plurality of packages flow along complicated paths to a destination, colliding with each other. | 62 | 1445 |
| 4 | Wine Dealer Storehouse Control System | Responding to customer's order, by controlling the contents of storehouse (container, brand, bottle). | 37 | 1308 |
| 5 | Equation of Five Elements and Higher Degrees | Solving five element higher degree simultaneous equation/equality. | 30 | 361 |
| 6 | Seat Booking System | Seat booking system of new trunk line with function of booking, waiting, alternative display, etc. | 155 | 1941 |
| 7 | Library Administration System | Lending book management, various display service, etc. | 76 | 1900 |
| 8 | Filing System | Assignment management for all resorces, such as member/file/volume etc. | 62 | 2150 |
| 9 | Elevator Control | Many elevators are operated smoothly and economically as a whole. | 137 | 3000 |
| 10 | V T A M | Simplified transmission administration system (including data transmission, route selection, flow control, dynamic change command of path) | 105 | 3000 |
| 11 | Travelling Salesman problem | Network circuiting short cut is found. | 63 | 1135 |

[8] Nature of Language L

The characteristics of language L described in the foregoing is as follows.

(a) Since the sentence structure of language L approximates to the natural language and is also added with another sentence structure in the form of numerical formula, the language L sentence structure exhibits a high readability and descriptivity, resulting in the advantages rather functional and easy to handle even in comparison with the pure natural language.

(b) In utilizing language L, the programers are quitely unconscious of the concept of such as a data structure, algorithm (example: bit, register, module, interruption, and so forth) as in the conventional language.

(c) Language L has a standardized language specification by which a static specification and a dynamic specification both can unifiedly be described. Engineers can mutually exchange their intention based on the specification written in language L, and it is possible to automatically resolve various problems on the software technique by way of analyzing the programming sentence. Such a possibility attributes to intention, i.e., inclusion of "meaning" into the language L vocabulary (basic word) approximating the natural language vocabulary.

(d) Language L has such a strong internal regular form that the program written by language L better withstands a mechanical processing (program conversion, program synthesis, and the like).

(e) The specification written by language L can automatically be logic synthesized, and extended to the object language program (for example, language C). Thereafter, it can immediately be executed.

(f) In the case that the program written in the object language is extended from the specification written by language L, not only the procedure part but also the data definition part is simultaneously generated automatically.

(g) Language L is a language based on a higher order intentional logic. However, in language L, the higher order intentional logic is extended by introduction of concept both of dynamic logic and of sort.

The expression converter 22, the logic synthesizer 23, and the like in FIG. 2 in this embodiment have been implemented by the processor written by a PROlOG language. As is well known, this language is suitable for a process which is accompanied with pattern matching rewriting etc. Needless to say, it is apparent from the explanation in the foregoing in detail that the other language can also be implemented in the same manner.

As described above, since a processing time for programming and test at the time of development by the conventional language is greatly reduced, the present invention remarkably improves productivity and reliability in the development such as a operating system, a control use software, various kinds of application software and so forth.

In advance of explanation for FIG. 9, the conventional technique before the time of the disclosure of the present invention will be described in the following manner.

In the case that software systems are written for operating in parallel, a situation which necessitates the description of the synchronization processes (synchronous processing) frequently appear. Moreover, a difficultly in the dynamic system development lies mostly in the realization of this synchronization processing.

Assuming the parallel processing system consisting of programs from A to S as follows.

(a) At the instance when a program A becomes a state of p and q, or becomes a state of s, then the program A executes v.

(b) At the instance when a program B becomes a state of q and r, the program B executes v.

(c) Program P generates a state of p.

(d) Program Q generates a state of q.

(e) Program R generates a state of r.

(f) Program S generates a state of s.

If this system is written in the conventional language, the programs P, Q, R, and S on the side in releasing the synchronization state, in order to realize the synchronization processing, are required to be conscious of the programs A and B which are in the synchronization state as well as the condition in which the synchronization state must be released. Accordingly, the description of the program such as the following comes to be required.

| (a) program A = | (b) program B = |
|---|---|
| wait(A) | wait |
| u | v |
| (c) program P = | (d) program Q = |
| p | q |
| if q | if r |
| then | then |
| post(A) | post(B) |
| | if p or s |
| | then |
| (e) program R = | post(A) |
| r | |
| if q | (f) program S = |
| then | s |
| post(B) | post(A) |

In the description by the conventional computer language, the programs on the side in releasing the synchronization state, must be conscious of the programs which are in the synchronization state as well as the condition in which synchronization state is released. Accordingly not only a descriptivity is deteriorated because of the increase of the amount of a description, but also a logic of the completed program has considerably been decreased in its readability. As a consequence, a complexity of the logic in the conventional computer language has been the cause to degrade a reliability of the parallel processing system as described in the aforegoing. It is thus desirable solve the program, to provide a programming language capable of concise description of synchronization processing in the parallel processing system, and to increase yield and quality of production in the parallel processing system development.

Figure 9:
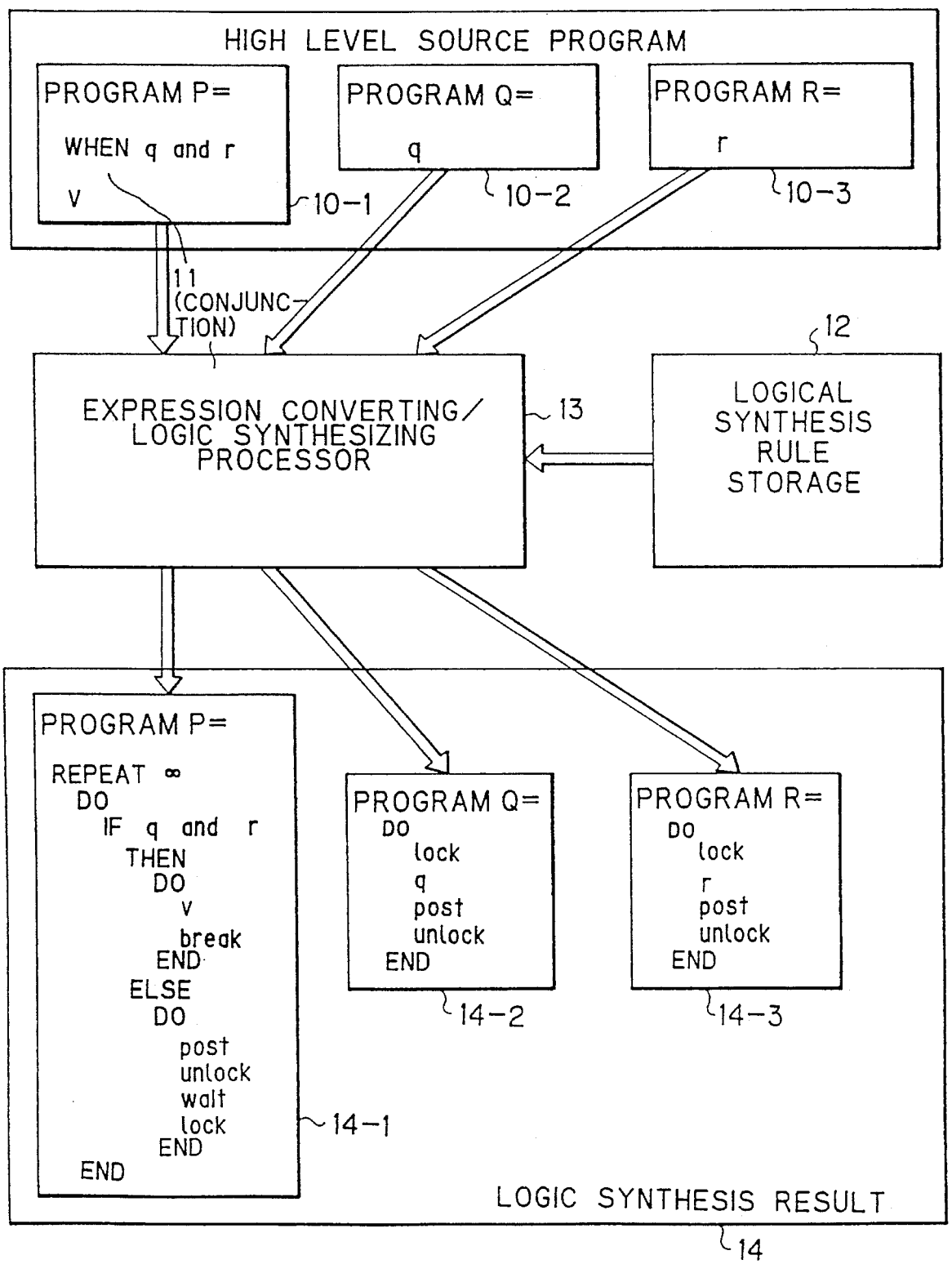
FIG. 9 is a block diagram illustrating another embodiment of the present invention.

FIG. 9 is a diagram illustrating a constitution of an example according to the present invention. Numeral 10 depicts a high level source program of a translation object, numeral 11 depicts a synchronization conjunction (WHEN) which is one of the basic words of the high level source program 10, numeral 12 depicts a logic synthesis rule storage which stores logic synthesis rules having a term rewriting rule with the synchronization conjunction, numeral 13 depicts a expression converter/logic synthesis processor, and numeral 14 depicts a logic synthesizing result by the description such as an intermediate language which has been extended in the form more approximating the machine language than the high level source program 10.

In the high level source program 10 handled in the present invention, a synchronization use conjunction 11 capable of writing as a synchronization condition the logic expression formula (wff) that can be described by use of the proportional logic or the predicate logic, is introduced as a basic word into the programming language.

A rewriting rule which can be used to rewrite into a sentence including the contents as shown in the following, is stored in the logic synthesis rule storage 12 with respect to a description containing the synchronization use conjunction (WHEN) 11.

WHEN [synchronization condition] [processing]→
① The following processing is repeated.
② Whether the logic expression formula (wff) of [standby condition] is true or false, is checked.
③ If true, then [processing] is performed, and to repeat the processing is terminated.
④ If false, then releasing the lock, and waiting an information of an event from the other. According to the information of the event, the processing on and after ② is repeated.

If the synchronization use conjunction 11 is detected at the time of the translation of the high level source program 10, then the expression converter/logic synthesis processor 13 rewrites a sentence containing the synchronization use conjunction 11 in accordance with the logic synthesis rule, and the rewrited result is outputted on the logic synthesis result 14.

This logic synthesis result 14 is written to the other known programming language or machine language with reference to the similar rewriting rule and the conventional technique, and if required, the result is made into a module in the executable form by means of the conventional compiler and linker.

OPERATION

Assuming that at the instance when a state of "q" and "r" is formed, there are simultaneously written a parallel processing system comprising a program P for executing "v", a program Q for generating a state of "q", and a program R for generating a state of "r", in this case for example such a description is programs 10-1, 10-2, and 10-3 as shown in FIG. 9.

In the descriptions of the program Q and R, it is satisfactory to describe the only processing for generating the states of "p" and "r", as shown in the figure. On the other hand, in the program P, using the synchronization conjunction (WHEN) 11, there is described a synchronization condition based on the logic formula (wff) annexed to the synchronization conjunction 11 as well as a processing at the time of completion of the synchronization condition.

The logic synthesis rule stored in the logic synthesis rule storage 12 is applied to the expression converter/logic synthesis processor 13 when a translation of the programs of 10-1 through 10-3 is performed. In this way, a rewriting to respective logic synthesis results 14-1 through 14-3 is executed.

REPEAT, lock, unlock, post, wait etc. in the logic synthesis result 14-1 are as follows.

REPEAT: repeating process

LOCK: lock process unlock: unlock process post: information of event occurrence wait: synchronization processing for releasing the waiting state based on any information of event occurrence These are a processing function which can be realized by the basic operation included in the ordinary operating system. The program outputted in the logic synthesis result 14 results in executing the synchronization (synchronous) operation and the synchronization releasing operation as intended. That is, the simplified description such as is shown in the high level source program 10 comes to be reduced to a program which consists of only the basic operation disposed in the ordinary operating system.

USAGE EXAMPLE OF SYNCHRONIZATION CONJUNCTION

The present invention relates particularly to a processing part of the synchronization use conjunction in language L processing system. The practical usage example of such conjunction is as follows.

Assuming that a parallel processing containing programs of from A through S is produced as undermentioned.

(a) Program P, at the instance of becoming a state of p and q, or a state of s, executes u.

(b) Program B, at the instance of becoming a state of q and r, executes v.

(c) Program P, generates a state of p.

(d) Program Q, generates a state of q.

(e) Program R, generates a state of s.

(f) Program S, generates a state of s.

The description of the above system using language L can be made together with the synchronization conjunction WHEN as in the following.

```
program A =
    WHEN  (p and q) or s
        u                        ......... (a)
program B =
    WHEN  q and r
        v                        ......... (b)
program P =
        p                        ......... (c)
program Q =
        q                        ......... (d)
program R =
        r                        ......... (e)
program S =
        s                        ......... (f)
```

Now, if the logic synthesis rule (RB12) as to "WHEN erasing" shown in [5.2] paragraph is applied to this description of program A-(a) in language L, the logic synthesis result as shown in FIG. 10(a) is obtained, Thereafter, the logic synthesis rules such as in RB2, RB3 are applied, however the processing in detail will be apparent from the foregoing explanations, and thus hereunder omitted. In the same manner, applying the logic synthesis rule (RB12) to the description of program B-(b) in the language L, the logic synthesis result as shown in FIG. 10(b) is obtained. In the description of a programs of from P through S, applying the extension rule of the base expression formula (RD12) as in [5], the extension results as shown in FIGS. 10(c) through 10(f) are obtained.

Figure 10:
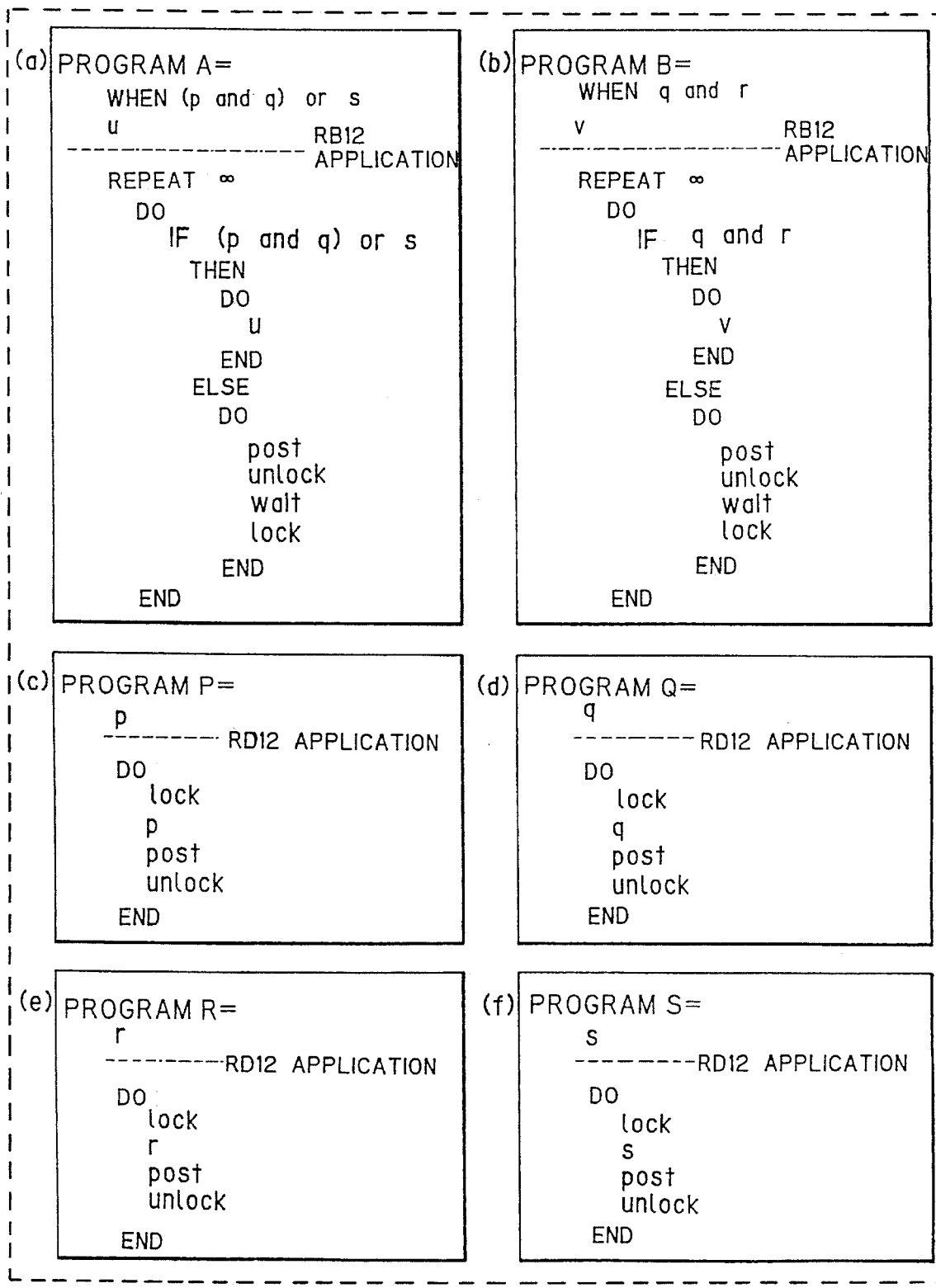
FIG. 10 is an example using a synchronization conjunction as illustrated in FIG. 9.

From the result shown in FIG. 10, the results apparently reveal a reduction to a program which consists of only the basic operation within the conventional language and ordinary operation system. Moreover, a function in detail as to the basic operation such as "lock," "unlock," "post," "wait," "REPEAT" etc. will also be explained in [6.1].

Through the use of the conventional technique, the description in the above can automatically easily be written in the object language, and thus a desired parallel processing system can be produced. An additional explanation appears to be hereunder unnecessary with respect to the intended synchronization (synchronous) operation and synchronization releasing operation executed by these programs.

As described above, according to the present invention, when the specification for software in the parallel operation is written, the description of the synchronization (synchronous) processes which essentially frequently appear can be concisely described using the conjunction WHEN, and accordingly yield and quality of the production and easiness in the maintenance in the development of the parallel processing can considerably be improved.

In advance to the explanation for FIG. 11, the conventional technique before the disclosure of the present invention, will be described as follows.

In the logic description of software, set operations such as "all things satisfying a certain condition are . . . ed (all operation)", "from among things, a certain one satisfying a certain condition are . . . ed (some operation)", or "from among things, some things satisfying a certain condition are . . . ed (many operations)", appear frequently.

In the conventional language, the description of programs which clearly specify a range of times to be repeated has to be made as a repeating processes referred to as "DO loop" or "FOR loop".

For example, in the case of " - - - put all red books on a certain desk.", the procedure description having the following meaning is required in the conventional language.

① Processing on and after ② is repeated for all books.

② Whether the book is red or not, is checked.

③ If the red book is found, following processings ④ and ⑤ are executed.

④ A certain desk is taken out from all desks.

⑤ The book is put on the desk.

⑥ If a book checked by ② is not red, a next book is taken out, and then processing returns to ②.

⑦ After finishing processing for all books repeating process is terminated.

In the description by the conventional computer language, a processing accompanied with a set operation must be written in the form of the repeating process, and therefore a required expression for the conventional computer language is quite different from the natural language which a human being uses.

If such a set operation is expressed simplifiedly and concisely in the form approximating the usage of the natural language, and furthermore can be executed finally on the computer, then it seems to realize a marked and rapid improvement of readability and descriptivity with respect to the programs.

However, even if these set operations will be standardized by the conventional language, the standardized form can be realized to a certain degree in only the simple and regular form using for example an application of macro description technique and the like. Although the description specifying such a set operation may appear even in any expression form that the predicative logic may permit, a flexibility in repose thereto be unavailable.

The object of the present invention is to resolve the above described problem, in particular to provide the program language capable of concise description for a set operation which may frequently appears in the software logic specification, and more paticularly to improve a readability and descriptivity of the programs.

Figure 11:
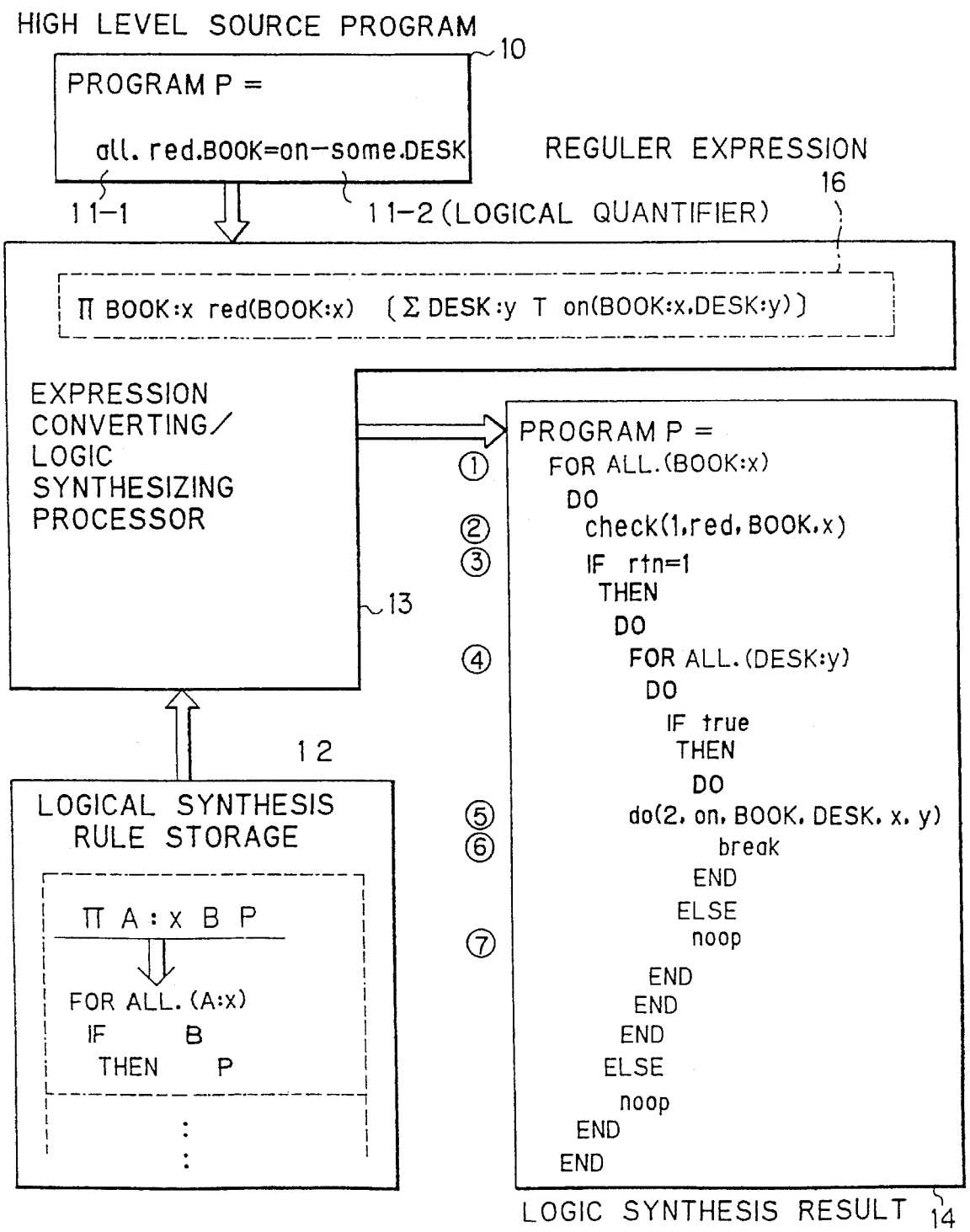
FIG. 11 is a block diagram illustrating still another embodiment of the present invention.

FIG. 11 is a diagram illustrating a constitution according to the present invention.

In the figure, numeral 10 depicts a high level source program which becomes an translation object, numeral 11-1 and 11-2 respectively indicate a logic quantifier including the set operation which is a basic word of the high level program source 10, numeral 12 depicts a logic synthesis rule storage for storing the logic synthesis rule including a rewriting rule relative to the logic quantifier, numeral 13 depicts a expression converter/logic synthesis processor, numeral 14 indicates a logic synthesis result, numeral 16 depicts a regular expression wherein the high level source program 10 is converted to the internal form having a constitution of a binary tree.

The logic quantifiers each accompanied with the set operation such as "all" (all), "some" (any of, or a certain), "many" (a plurality of, or several number of) are introduced into the high level source program 10 as a basic word in the program language, according to the present invention.

These logic quantifiers are used as a basic word effective not only for a propositional expression formula which determines truth or falsehood but also for an act formula which acts a change of state.

The logic synthesis rule storage 12 is utilized for storing the rewriting rules and the like of various terms. In particular in this invention with respect to terms containing the logic quantifiers, the storage 12 stores logic synthesis rules used for rewriting into relatively a small number of basic operations made of the lower level language sometimes including a repeating process.

In the logic quantifier accompanied with the set operation is detected at the time of translation of the high level source program 10, the expression converter/logic synthesis processor 13, in accordance with the logic synthesis rule stored in the logic synthesis rule storage 12, executes the processing in which a sentence containing the logic quantifier is converted into a statement reduced to relatively a small number of the basic operation including the repeating process which is used in the ordinary language processor. The result is outputted on the logic synthesis result 14.

The logic synthesis result 14 can be written down into other conventional language or machine language, and therefore a module in the executable form is produced by the conventional compiler or linker in reponse to a demand.

OPERATION

The first, any logic expression formula such as "all" (all), "a certain" or "any of" (some), "a plurality of" or "several number of" (many) is converted into either of the following three regular expression forms (practically, the conversion is available).

i) $(((\pi x_A)B)C)$ ii) $(((\Sigma x_A)B)C)$ iii) $((((\Theta n)x_A)B)C)$ where, with respect to symbols, $\pi$ is for "all (all)", and $\Sigma$ is for "a certain (some)", and $\Theta$ is for "a plurality of (many)". and A is any of common noun, and B is propositional logic formula, and C is propositional logic formula or act logic formula, and n is numeral, and x is variable, respectively.

$x_A$ is another symbol representing "A:x".

The logic formulas B and C also take the expression from the above three regular expression forms.

As described in the foregoing, any of complicated logic expression formulas can be reduced to a small number of basic operations by means of repeatedly applying the predetermined term rewriting rule stored in the logic synthesis rule storage 12, with respect to the logic formula described in the regular expression.

For example, according to the present invention, as shown in the high level source program 10 in FIG. 1, the description of process of " - - - put all red books on a certain desk." is provided as undermentioned.

"all.red.book=on-some.desk"

This expression as a regular form as shown in the regular expression 16.

The logic synthesis rule storage 12 includes rules such as the rule for converting the regular expression of type of:

"$\pi x_A$ B P"

into

| FORALL.(A:x) |
|---|
| IF     B |
| THEN     P  , | as well as the rule for converting the regular expression of type of:

"$\Sigma x_A$ B P", and the other like rules. Therefore, the rules included in the storage 12 are not limited to the above example.

The expression converter/logic synthesis processor 13 delivers the output of the logic synthesis result 14 by rewriting the regular expression 16 through use of these logic synthesis rules.

In the logic synthesis result 14 as shown in FIG. 11,

Symbol ① is the sentence for specifying a repeating process until a corresponding END sentence in connection with all books (variable x).

Symbol ② is a function for the check as to whether book (x) is red or not. If the result is true, then "rtn" becomes "1". If "rtn" is "1", then a process on or after THEN is performed by the judgement of ③.

Symbol ④ specifies a repeating process until a corresponding END sentence in connection with all desks (variable y).

Symbol ⑤ is a function for specifying a process that book (x) is put on desk (y). In other words, a link processing of table is performed for connecting desk (y) and book (x).

Symbol ⑥ is a sentence for specifying a process of compulsory escaping from the present loop. This is responsive to the use of "some" on the high level source program 10 as the logic quantifier for desk.

Symbol ⑦ is a sentence for indicating no operation (no operation).

In the diagram as shown in FIG. 11, it may be proved that these logic synthesis results 14 realize a intended set operation, and consequently the results 14 are easily extended to a low level object language by the technique which is a set of basic operations handled with the conventional language and which is used in the conventional compiler or the like.

EXTENSION EXAMPLE OF THE LOGIC QUANTIFIER

The present invention relates in particular to a processor of the logic quantifier in language L processing system. The use and extension example for the logic quantifier is as follows.

Assuming the description for "from among red pens, the red pens on the desk are all put in a box which is in somewhere."

This process can be represented in various forms by the simplified sentence structure, and the following is an example.

```
    for all.red.PEN:x
        where the.PEN:x=on-some.DESK:y
            the.PEN:x=in-some.BOX:z
```

This is represented by a regular expression formula as follows.

```
Π PEN:x (red(PEN:x) ∧
            ( Σ DESK:y T on(PEN:x,DESK:y)))
    (Σ BOX:z T  ⊙ (in(PEN:x,BOX:z)))
```

The various logic synthesis rules as described in [5] will be applied for the above formula. The applied portion is underlined in the following.

⇩ ⌈Logic synthesis rule RB8 is applied.⌋

```
FORALL(PEN:x)
    IF red(PEN:x) ∧ ( Σ DESK:y T on (PEN:x,DESK:y))
    THEN
        Σ BOX:z T  ⊙ (in(PEN:x,BOX:z)))
    ELSE
        noop
```

⇩ ⌈Logic synthesis rule RB2 is applied.⌋

```
FORALL(PEN:x)
    IF red(PEN:x)
    THEN
        IF   DESK:y T on(PEN:x,DESK:y))
        THEN
            Σ BOX:z T  ⊙ (in(PEN:x,BOX:z))
        ELSE
            noop
    ELSE
        noop
```

⇩ ⌈Logic synthesis rule RB6 is applied.⌋

```
FORALL(PEN:x)
    IF red(PEN:x)
    THEN
        DO
            truth=0
            FORALL(DESK:y)
                DO
                    IF T ∧ on (PEN:x, DESK:y)
                    THEN
                        DO
                            truth=1
                            break
                        END
                    ELSE
                        noop
                END
            IF truth=1
            THEN
                Σ BOX:z T  ⊙ in(PEN:x,BOX:z)))
            ELSE
                noop
    ELSE
        noop
```

⇩ ⌈Logic synthesis rule RB2 is applied.⌋

```
FORALL(PEN:x)
    IF red(PEN:x)
    THEN
        DO
            truth=0
            FORALL(DESK:y)
                DO
                    IF T
                    THEN
                        IF on(PEN:x,DESK:y)
                        THEN
                            DO
                                truth=1
                                break
                            END
                        ELSE
                            noop
                    ELSE
                        noop
                END
            IF truth=1
            THEN
                Σ BOX:z T  ⊙ (in(PEN:x,BOX:z)))
            ELSE
                noop
    ELSE
        noop
```

⇩ ⌈Logic synthesis rule RB9 is applied.⌋

```
FORALL(PEN:x)
    IF red(PEN:x)
    THEN
        DO
            truth=0
            FORALL(DESK:y)
                DO
                    IF T
                    THEN
                        IF on(PEN:x,DESK:y)
                        THEN
                            DO
                                truth=1
                                break
                            END
                        ELSE
                            noop
                    ELSE
                        noop
                END
            IF truth=1
            THEN
                DO
                    FORALL(BOX:z)
                        IF T
                        THEN
                            DO
                                ⊙ (in(PEN:x,BOX:z))
                                break
                            END
                        ELSE
                            noop
                    END
            ELSE
                noop
    ELSE
        noop
```

⇩ ⌈Logic synthesis rule RD1-1, RD1-2, and RD2-2.⌋
       are applied.

```
FORALL(PEN:x)
    DO
        check(1,on,PEN,x)
        IF rtn=1
        THEN
            DO
                truth=0
                FORALL(DESK:y)
                    DO
                        IF T
                        THEN
                            DO
                                check(2,PEN,DESK,x,y)
                                IF rtn=1
                                THEN
                                    DO
                                        truth=1
                                        break
                                    END
                                ELSE
                                    noop
```

```
            ELSE
                noop
        END
    IF truth=1
        THEN
            DO
                FORALL(BOX:z)
                    IF T
                        THEN
                            DO
                                do(2,in,PFN,BOX,x,z)
                                break
                            END
                        ELSE
                            noop
                    END
                ELSE
                    noop
            ELSE
                noop
    END
```

It should also be understood that the foregoing is for illustrative purposes. The scope of the invention is defined by the appended claims rather than by the description preceding them, and all changes that fall within meets and bounds of the claims, or equivalence of such meets and bounds are therefore intended to be embraced by the claims.

What is claimed is:

1. A programming language processing system for use as a computer language processing system wherein a program described in a high level programming language is translated into a program written in a low level programming language, comprising:

means for inputting a program described according to a specification of a programming language in which basic words are classified by parts-of-speech including nouns, adjectives, conjunctions, and logic words;

processing means for converting said program described according to said specification into an internal expression form based on a sentence structure of a type that can be converted to a binary tree, and for converting a logical meaning expressed by said internal expression form, according to program logic for term-rewriting based on pattern collation, to a low level program description in which said parts-of-speech are deleted.

2. The programming language processing system as recited in claim 1, wherein said processing means includes:

means for obtaining a logic synthesis result according to said program logic, from said internal expression form, said logic synthesis result comprises an intermediate sentence structure and an intermediate instruction, and means for generating a program procedure part from said intermediate sentence structure and said intermediate instructions, said program procedure part being formed by an object language, and for automatically generating a program declaration part required by said program written in said object language.

3. A programming language processing system for use as a computer language processing system wherein a first program described in a high level programming language is translated into a second program written in low level programming language, comprising:

means for inputting a synchronization conjunction having a well-formed formula described on the basis of a propositional logic or a predicate logic written as a synchronization condition, said synchronization conjunction being used as a basic word in a programming language; and processing means for generating, when said synchronization conjunction is detected at a time of translating the high level programming language and according to a logic synthesizer rule, a row of statements comprising:

a first statement for checking an establishment of said synchronization condition, a second statement for executing a specified process when said synchronization condition has been completed, and a third statement for holding wait while said synchronization condition has not yet been completed, said processing means converting said first program, based on said row of statements, to said second program.

4. A programming language processing system for use as a computer language processing system wherein a first program described in a high level programming language is translated into a second program written in low level programming language, comprising:

means for inputting logic quantifiers with a set operation, said logic quantifiers being used as a basic word of a programming language; and processing means for receiving said logic quantifiers, for converting a sentence including said logic quantifiers into a statement which is reduced to a basic operation when said logic quantifiers in said sentence are detected at the time of translating said high level programming language, in accordance with a logic synthesis rule for rewriting said programming language into a plurality of said basic operations formed by said low level programming language and for judging truth or falsehood by a propositional logic formula which represents a condition judgment and acting to provide a change of a state by an act logic formula, said judging and said acting being performed when the second program is run.

5. The programming language processing system as recited in claim 4, wherein said plurality of said basic operations include a repeating process for said sentence including said logic quantifiers.

* * * * *

UNITED STATES PATENT AND TRADEMARK OFFICE
CERTIFICATE OF CORRECTION

PATENT NO. : 5,530,863
DATED : June 25, 1996
INVENTOR(S) : HINO

It is certified that error appears in the above-indentified patent and that said Letters Patent is hereby corrected as shown below:

Col. 13, line 50, change "[A→B]" to --[A ∧ B]--;
line 55, change "''if" to --'if--;
line 57, change "II" to --Π--;
line 59, change "II" to --Π--;
line 63, change "Σ" to --Σ--;
line 67, change "Θ" to --Θ--.

Col. 14, line 27, change "⊂" to --⊆--;
line 28, change "⊂" to --⊆--;
line 63, change "z,1" to --→--.

Col. 15, line 27, change "II" to --Π--;
line 33, change "II" to --Π--;
line 45, change "Σ" to --Σ--;
line 60, change "Θ" to --Θ--.

Col. 45, line 11, change "do(2,in,PFN,BOX,x,z)" to --do(2,in,PEN,BOX,x,z)--.

Signed and Sealed this

Twenty-sixth Day of November 1996

Attest:

BRUCE LEHMAN

*Attesting Officer*     Commissioner of Patents and Trademarks